(12) United States Patent
Sekhavat et al.

(10) Patent No.: US 12,472,099 B2
(45) Date of Patent: Nov. 18, 2025

(54) MEDICAL DEVICE AND OCULAR IMPLANT FOR TREATMENT OF OCULAR DISORDERS

(71) Applicant: Hexiris Inc., Dieppe (CA)

(72) Inventors: Houfar Sekhavat, Dieppe (CA); Nir Shoham-Hazon, Dieppe (CA)

(73) Assignee: Hexiris Inc., Dieppe (CA)

( * ) Notice: Subject to any disclaimer, the term of this patent is extended or adjusted under 35 U.S.C. 154(b) by 0 days.

(21) Appl. No.: 19/235,272

(22) Filed: Jun. 11, 2025

(65) Prior Publication Data

US 2025/0312194 A1    Oct. 9, 2025

Related U.S. Application Data

(63) Continuation of application No. PCT/CA2023/051644, filed on Dec. 12, 2023.

(60) Provisional application No. 63/466,798, filed on May 16, 2023, provisional application No. 63/432,270, filed on Dec. 13, 2022.

(51) Int. Cl.
*A61F 9/007* (2006.01)
*A61B 17/00* (2006.01)
*A61B 17/34* (2006.01)

(52) U.S. Cl.
CPC ...... *A61F 9/00781* (2013.01); *A61B 2017/00367* (2013.01); *A61B 2017/00477* (2013.01); *A61B 17/3468* (2013.01)

(58) Field of Classification Search
CPC .... A61F 9/0017; A61F 9/007; A61F 9/00781; A61B 17/3468; A61B 2017/00367; A61B 2017/00477
See application file for complete search history.

(56) References Cited

U.S. PATENT DOCUMENTS

| | | | |
|---|---|---|---|
| 5,405,330 A | 4/1995 | Zunitch et al. | |
| 6,558,342 B1 * | 5/2003 | Yaron | A61F 9/00781 604/9 |
| 9,693,899 B2 * | 7/2017 | Wardle | A61F 9/0017 |

(Continued)

FOREIGN PATENT DOCUMENTS

| | | |
|---|---|---|
| CA | 3058571 A1 | 4/2021 |
| WO | WO-2004/026106 A2 | 4/2004 |
| WO | WO-2015/083828 A1 | 6/2015 |

OTHER PUBLICATIONS

International Search Report and Written Opinion for Application No. PCT/CA2023/051644, mailed Mar. 11, 2024.

*Primary Examiner* — Philip R Wiest
(74) *Attorney, Agent, or Firm* — MARSHALL, GERSTEIN & BORUN LLP

(57) ABSTRACT

A medical device for office-based/operating room bleb forming minimally invasive glaucoma surgeries. The medical device includes a proximal segment for grasping by a user, a distal segment that includes a piercing member coupled to and extending from the distal segment, wherein the piercing member is configured to contain and deliver an ocular implant into an eye tissue layer to obtain a channel, wherein the proximal segment and the distal segment being configured to couple to each other at a pivot point between an unlocked configuration and a locked configuration, and wherein in the unlocked configuration, the proximal segment and the distal segment are rotatable relative to each other about a rotation axis at the pivot point.

17 Claims, 13 Drawing Sheets

(56) References Cited

U.S. PATENT DOCUMENTS

| | | | |
|---|---|---|---|
| 9,993,368 B2 | 6/2018 | Bergheim et al. | |
| 2004/0267209 A1* | 12/2004 | Kunishige | A61M 5/322 |
| | | | 604/243 |
| 2006/0085013 A1* | 4/2006 | Dusek | A61F 2/1664 |
| | | | 606/107 |
| 2007/0123812 A1* | 5/2007 | Pinchuk | A61F 9/00781 |
| | | | 604/8 |
| 2009/0125034 A1* | 5/2009 | Pynson | A61F 2/1678 |
| | | | 606/107 |
| 2010/0274259 A1* | 10/2010 | Yaron | A61M 27/002 |
| | | | 604/8 |
| 2013/0131589 A1 | 5/2013 | Mudd et al. | |
| 2013/0184631 A1* | 7/2013 | Pinchuk | A61F 9/00781 |
| | | | 604/8 |
| 2013/0267931 A1* | 10/2013 | Nazzaro | A61F 9/0017 |
| | | | 604/506 |
| 2015/0148729 A1* | 5/2015 | Pinchuk | A61M 27/002 |
| | | | 604/8 |
| 2016/0354245 A1* | 12/2016 | Horvath | A61F 9/00781 |
| 2020/0069469 A1* | 3/2020 | Horvath | A61F 9/00736 |
| 2020/0139055 A1 | 5/2020 | Weksel et al. | |
| 2020/0197628 A1 | 6/2020 | Mccullough et al. | |
| 2022/0015947 A1* | 1/2022 | Romoda | A61F 9/00781 |

* cited by examiner

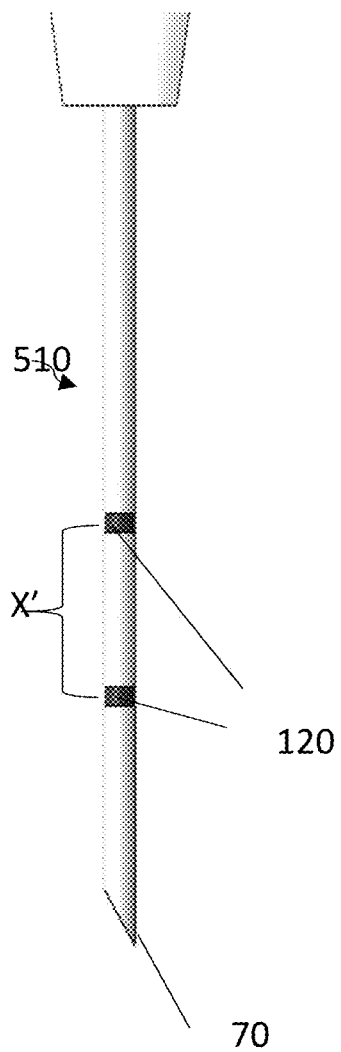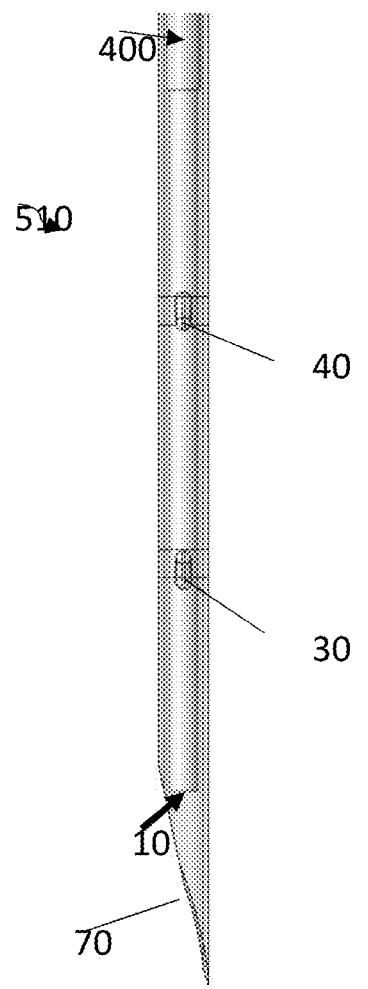
FIG. 5A
FIG. 5B

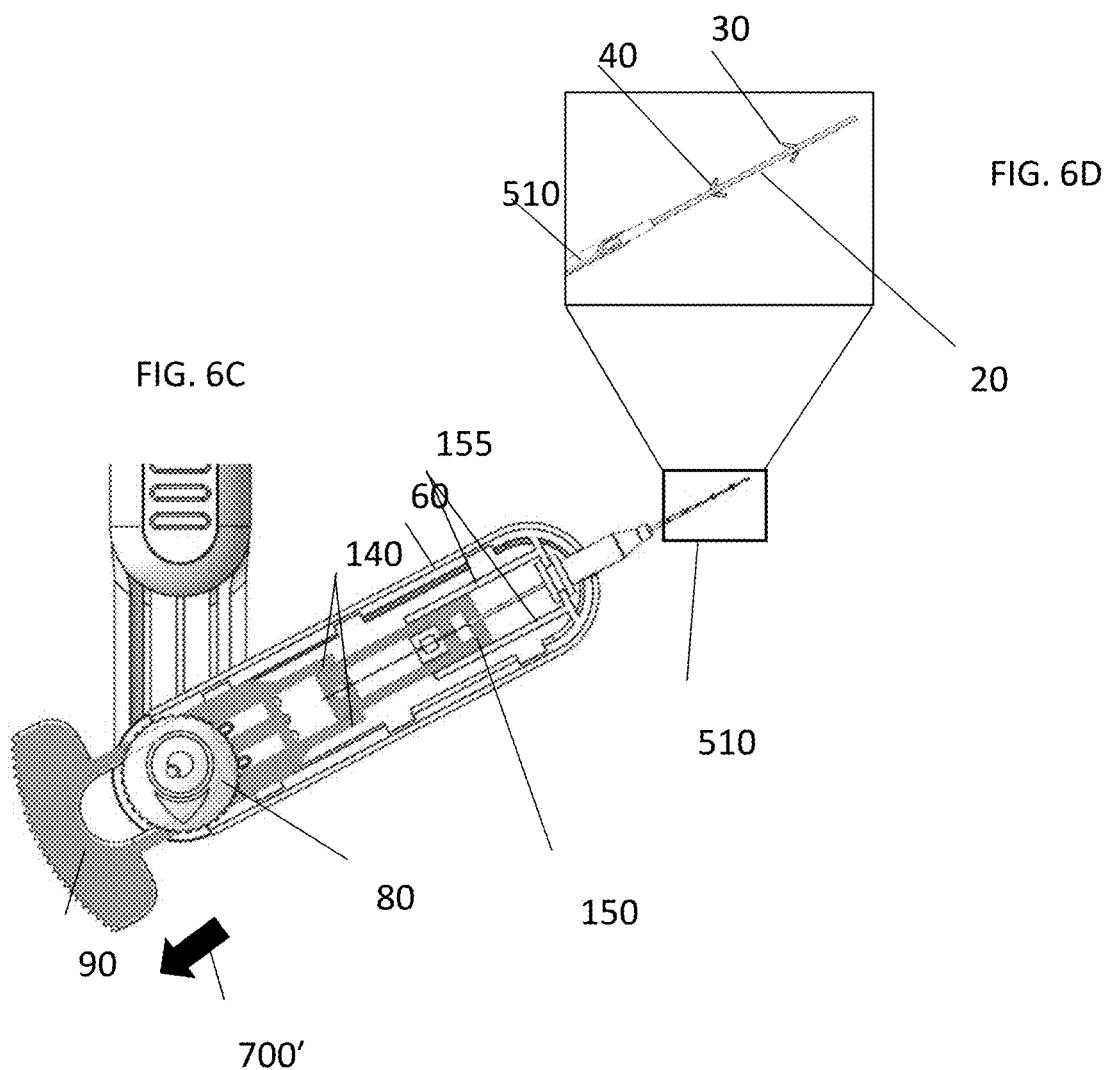

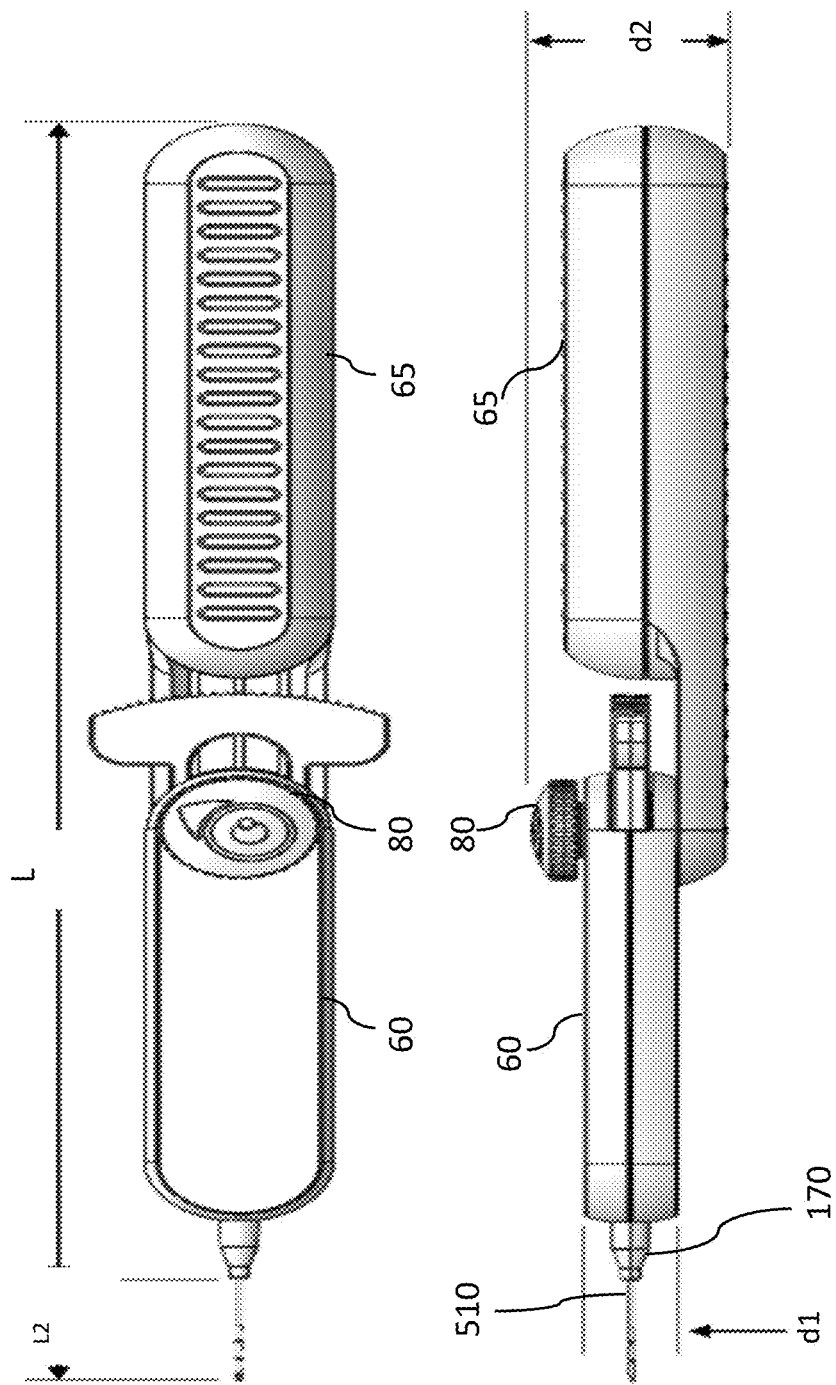
FIG. 9A
FIG. 9B
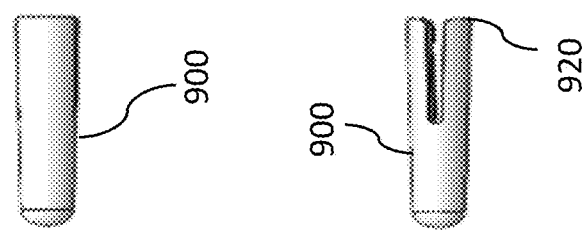

MEDICAL DEVICE AND OCULAR IMPLANT FOR TREATMENT OF OCULAR DISORDERS

CROSS-REFERENCE TO RELATED APPLICATIONS

The present application is a Continuation of International Patent Application No. PCT/CA2023/051644, filed Dec. 12, 2023, which claims the benefit of U.S. provisional patent application Ser. No. 63/432,270 filed on Dec. 13, 2022, and U.S. provisional patent application Ser. No. 63/466,798 filed on May 16, 2023. The contents of each of the above-referenced document are incorporated herein by reference in their entirety.

TECHNICAL FIELD

The present disclosure relates to ophthalmologic systems. More specifically, the present disclosure relates to ophthalmologic systems including medical devices and ocular implants for treatment of ocular diseases.

BACKGROUND

Glaucoma is a group of eye diseases characterized by optic neuropathy, which can be associated with raised intraocular pressure (IOP). Glaucoma is the leading cause of irreversible blindness in the world. The primary goal of treatment is to lower the IOP by means of medicines or surgical procedures. Typically, surgical procedures and medical devices for treatment of eye disorders such as glaucoma are based on inside the eye (ab interno) or outside the eye (ab externo) approaches.

A recent development in the practice of glaucoma treatment is the use of microincisional glaucoma surgery (MIGS), which refers to a group of surgical procedures that typically involve implantation of small ocular implants. MIGS operations attempt to minimize intraoperative and postoperative management, as well as provide a less intrusive method of lowering IOP than standard glaucoma surgery, with the objective of minimizing reliance on topical drugs. Several ophthalmologic systems and procedures have been proposed.

U.S. Pat. No. 9,993,368 (Glaukos, et al.) describes an ab interno system for treatment of glaucoma. This system includes a delivery device having a hand piece and an elongate delivery member and an ophthalmic implant comprising a body having a proximal section and a distal section with respect to the hand piece of the delivery device, where at least the distal section is curved so as to fit within and extend along a portion of a Schlemm's canal of an eye following implantation using the delivery device. The elongate delivery member is configured for ab interno insertion of the ophthalmic implant through a corneal incision and sized to extend across the anterior chamber. The elongate delivery member is also configured to retain the ophthalmic implant therein prior to implantation, and to deliver the ophthalmic implant through a trabecular meshwork of the eye and into and along the portion of the Schlemm's canal.

U.S. Pat. No. 9,693,899 (Ivantis, et al.) describes an ab interno system for treatment of glaucoma. This system includes a segment, a cannula coupled to the segment, the cannula sized and configured for insertion into Schlemm's canal of a human eye, and a delivery mechanism disposed on the segment. The delivery mechanism is configured to advance and retract an ocular implant within the cannula. An orientation mechanism is disposed on the segment, where the orientation mechanism is configured to control rotation of the cannula, and where the ocular implant maintains its orientation with respect to the cannula when the cannula is rotated.

Because of the advantages of MIGS procedures over more conventional treatments, efforts to improve such procedures and associated ophthalmologic systems are ongoing.

SUMMARY

This Summary is provided to introduce a selection of concepts in a simplified form that are further described below in the Detailed Description. This Summary is not intended to identify key aspects or essential aspects of the claimed subject matter.

In one broad aspect, the present disclosure relates to a medical device, the device comprising a proximal segment for grasping by a user, an ocular implant, and a distal segment that includes a piercing member coupled to and extending from the distal segment, wherein the piercing member is configured to contain and deliver the ocular implant into an eye tissue layer to obtain a channel, wherein the proximal segment and the distal segment are configured to couple to each other at a pivot point between an unlocked configuration and a locked configuration, and wherein in the unlocked configuration, the proximal segment and the distal segment are rotatable relative to each other about a rotation axis at the pivot point.

In some embodiments, the medical device may include one or more of the following features:
- any feature described in the present text and/or illustrated in the accompanying drawings, which is applicable to the medical device.
- a locking mechanism for reversibly securing the proximal segment and the distal segment in the locked configuration.
- the piercing member includes an elongated hollow body for containing the ocular implant.
- the medical device is configured to retract the piercing member from an extended position to a retracted position.
- the piercing member includes a piercing tip at a distal end thereof.
- further comprising an actuator assembly configured to actuate the piercing member.
- the actuator assembly includes a manually operable actuator, and wherein the actuator assembly is further configured to operatively couple the actuator to the piercing member.
- the distal segment includes an internal surface defining an internal cavity, and wherein the medical device further comprises an internal casing disposed within the internal cavity and configured to couple to the piercing member.
- engagement of the actuator causes the actuator to couple with the internal casing.
- release of the actuator causes an axial displacement of the internal casing towards a proximal end of the distal segment, causing the piercing member to retract towards the distal segment.
- the medical device further comprises the ocular implant, wherein the ocular implant has an elongated body having an internal surface defining a substantially continuous internal lumen, and wherein the ocular implant is contained within the piercing member.
- the medical device has a length of from about 100 mm to about 300 mm, preferably a length of about 145 mm.

the piercing member has a size corresponding to a needle gauge of from 23 to 30, preferably a size corresponding to a needle gauge of 27.

the piercing member has a length of from about 8.0 mm to about 20.0 mm, preferably a length of about 13.0 mm.

In one broad aspect, the present disclosure relates to an ocular implant, comprising an elongated body having an internal surface defining an internal lumen forming a corresponding channel, and a first engaging element and a second engaging element located at the surface of the elongated body, wherein the first and second engaging elements extend away from the surface of the elongated body, wherein the first and second engaging elements are in a spaced apart relationship along the surface of the elongated body, and wherein the first and second engaging elements are compressible towards the elongated body.

In some embodiments, the ocular implant may include one or more of the following features:

any feature described in the present text and/or illustrated in the accompanying drawings, which is applicable to the ocular implant.

the first and second engaging elements are angled toward each other.

the first and second engaging elements have a rod shape and extend from the elongated body at an acute angle.

the ocular implant has a substantially circular cross-section over its entire length.

the first and second engaging elements have a combined width with the elongated body of from about 0.400 mm to about 0.800 mm, preferably 0.600 mm.

the first and second engaging elements are spaced apart by a distance of from about 1.8 mm to about 2.2 mm, preferably a distance of about 2.0 mm.

the elongated body has an outside wall defining an outside diameter of from about 0.100 mm to about 0.450 mm, preferably 0.254 mm.

the implant has a lumen cross section diameter of from about 0.010 mm to about 0.250 mm, preferably of about 0.051 mm.

the ocular implant has a length of from about 5.0 mm to about 6.5 mm, preferably a length of about 6.35 mm.

In one broad aspect, the present disclosure relates to a method, comprising obtaining the medical device as described herein, in the unlocked configuration, rotating the distal segment about the rotation axis at the pivot point to select a working angle between the distal segment and the proximal segment, and in the locked configuration, performing an insertion of an ocular implant in an eye tissue layer to form a drainage channel.

In some embodiments, the method may include one or more of the following features:

any feature described in the present text and/or illustrated in the accompanying drawings, which is applicable to the method.

performing the insertion includes positioning the medical device at a first point with respect to the eye and advancing the medical device along a longitudinal axis of the distal segment until the piercing member contacts an external surface of the eye tissue layer.

performing the insertion further includes progressing the medical device to cause the piercing member to perform an incision in the eye tissue layer with an axial cutting motion, and progressing the piercing member through the incision into and through the tissue layer.

progressing the piercing member through the incision into and through the tissue layer is performed until the piercing member has reach a desired depth.

the desired depth is determined based on a position of one or more marking on the piercing member relative to the eye tissue layer.

performing the insertion further includes retracting the piercing member towards a distal end of the distal segment, causing release and delivery of the ocular implant into the eye tissue layer.

In one broad aspect, the present disclosure relates to a medical device, the device comprising a proximal segment for grasping by a user, an ocular implant, a distal segment that includes a piercing member coupled to and extending from the distal segment, wherein the piercing member is configured to contain and deliver the ocular implant into an eye tissue layer to obtain a channel, wherein the piercing member includes one or more markings on a surface thereof which is indicative of when the piercing member has reached a desired depth into the eye tissue layer.

In some embodiments, the medical device may include one or more of the following features:

any feature described in the present text and/or illustrated in the accompanying drawings, which is applicable to the medical device.

the ocular implant comprises an elongated body having an internal surface defining an internal lumen forming the channel, and a first engaging element and a second engaging element located at the surface of the elongated body, wherein the first engaging element and the second engaging element are configured to engage with, or abut against, eye tissue structures to prevent movement of the ocular implant relative to the eye.

the one or more markings includes a first marking and a second marking disposed on the surface of the piercing member at a location that coincides with the respective position of the first and second engaging elements.

the first marking and the second marking ocular are disposed on the surface of the piercing member at a distance one from another of from about 1.8 mm to about 2.2 mm, preferably 2.0 mm.

the piercing member has a size corresponding to a needle gauge of from 23 to 30, preferably a size corresponding to a needle gauge of 27.

the piercing member has a length of from about 8.0 mm to about 20.0 mm, preferably a length of about 13.0 mm.

All features of exemplary embodiments which are described in this disclosure and are not mutually exclusive can be combined with one another. Elements of one embodiment can be utilized in the other embodiments without further mention. Other aspects and features of the present invention will become apparent to those ordinarily skilled in the art upon review of the following description of specific embodiments in conjunction with the accompanying Figures.

BRIEF DESCRIPTION OF THE DRAWINGS

A detailed description of specific exemplary embodiments is provided herein below with reference to the accompanying drawings in which:

FIG. 5A is a non-limiting view of a piercing member for use with the medical device of FIG. 2 in accordance with an embodiment of the present disclosure;

FIG. 5B is an elevated transparent view of the piercing member containing the ocular implant, in accordance with an embodiment of the present disclosure;

FIGS. 6A-6D are non-limiting cross section views of the medical device with the piercing member and the ocular implant, in accordance with embodiments of the present disclosure;

FIG. 9A is a non-limiting elevated view of the medical device with a cap to cover the piercing member, in accordance with embodiments of the present disclosure;

FIG. 9B is a non-limiting side view of the medical device of FIG. 9A, in accordance with embodiments of the present disclosure;

Figure 1:
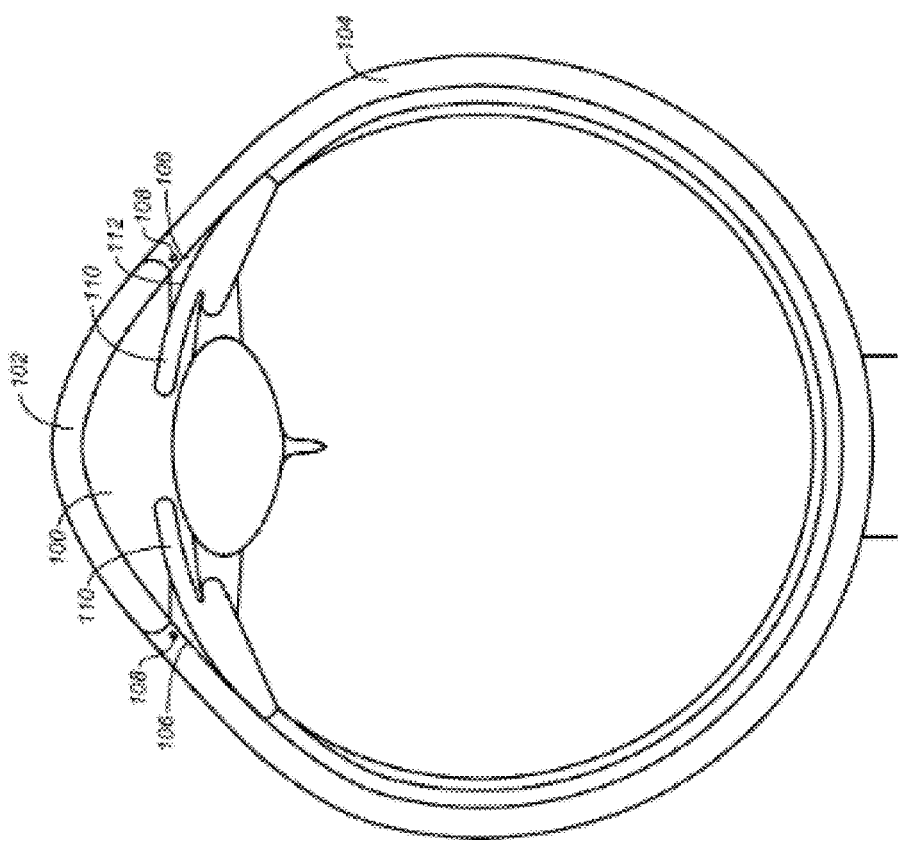
FIG. 1 is a cross sectional schematic diagram of a human eye.

In the drawings, exemplary embodiments are illustrated by way of example. It is to be expressly understood that the description and drawings are only for the purpose of illustrating certain embodiments and are an aid for understanding. They are not intended to be a definition of the limits of the disclosure.

DETAILED DESCRIPTION

The present technology is explained in greater detail below. This description is not intended to be a detailed catalog of all the different ways in which the technology may be implemented, or all the features that may be added to the instant technology. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art considering the instant disclosure which variations and additions do not depart from the present technology. Hence, the following description is intended to illustrate some embodiments of the technology, and not to exhaustively specify all permutations, combinations, and variations thereof.

Described herein is a medical device configured to form a channel in a target tissue layer. For example, a tissue layer of an eye for treatment of ocular disorders or diseases. For example, a drainage channel for reducing eye internal pressure. For example, the eye can be a human eye.

In some embodiments, the medical device can deliver and position an ocular implant in an eye tissue layer. For example, a tissue layer interfacing the anterior chamber of the eye to enable drainage of excessive fluid from inside the anterior chamber of the eye.

In some embodiments, the medical device can be useful for treatment of glaucoma.

In some embodiments, the medical device is configured to form a channel in a target tissue layer with an ab externo ophthalmological method.

The present inventors have surprisingly observed that commercial ophthalmologic medical devices or systems suffer from one or more drawbacks, which are more readily observed by medical practitioners when performing ophthalmological procedures:

a) The PreserFlo™ MicroShunt (InnFocus Inc., Miami, FL) is implanted via an ab externo approach performed under topical anesthesia, where aqueous humor drained from the anterior chamber is directed via the MicroShunt to a bleb produced under the conjunctiva and Tenon's capsule. Following flow confirmation, the MicroShunt's distal end is tucked under Tenon's capsule and conjunctiva. After ensuring that the device is straight and free of tissue, sutures are necessary to reattach Tenon's capsule and conjunctiva over the device and to the limbus. This medical device requires an operating room (OR), glaucoma surgeons, eye dissection, and represents an invasive surgery;

b) The Xen™ gel stent (Aquesys Inc, Aliso Viejo, CA) is implanted under sub-Tenon's (90%), retrobulbar or topical anesthesia using an ab interno approach in the OR. Implantation uses a goniolens to assess positioning in the angle, ideally entering just above trabecular meshwork to avoid bleeding and to stay clear of iris and endothelium;

c) The iStent™ (Glaukos, Aliso Viejo, CA) is implanted under topical anesthesia in an OR using an ab interno approach, which requires seeing the insertion angle with a goniolens, an opening of at least 1.5 mm of the eye (i.e., increasing infection risks) and implantation in the trabecular meshwork (drainage spot);

d) The Hydrus™ Microstent (Ivantis™, Alcon, Irvine, CA) is implanted into the Schlemm's canal using an ab interno approach in an OR using a preloaded delivery cannula, through a small clear-corneal paracentesis with visualization of the angle being performed via a goniolens. The delivery cannula is slightly curved to conform to the morphology of the angle and the Schlemm's canal.

Except for the PreserFlo™ MicroShunt, these commercial ophthalmologic medical devices and systems require an ab interno procedure. While such ab interno subconjunctival filtration procedures have been successful in relieving intraocular pressure, there is a substantial risk that the intraocular shunt may be deployed too close to the conjunctiva, resulting in irritation and subsequent inflammation and/or scarring of the conjunctiva, which can cause the glaucoma filtration procedure to fail (See Yu et al., Progress in Retinal and Eye Research, 28:303-328 (2009)). Additionally, commercially available shunts that are currently utilized in such procedures are not ideal for ab interno subconjunctival placement due to the length of the shunt (i.e., too long) and/or the materials used to make the shunt (e.g., gold, polymer, titanium, or stainless steel), and can cause significant irritation to the tissue surrounding the shunt, as well as the conjunctiva, if deployed too close.

Ab interno procedures are also demanding as, generally, the success of such procedures relies significantly on the skill of the surgeon and the capacity to precisely observe the path of the surgical instrument within the anterior chamber, and reaching the filtration angle. Moreover, there are inherent risks to vital organs like the iris and lens, as well as the angle structures, which remain unobservable without the use of an additional gonioscopic lens.

The herein described medical device and procedure address at least one or more of the drawbacks reported with the commercial ophthalmologic medical devices or systems, and offer at least one or more of the following advantageous features:

For example, the herein described medical device can be used for the treatment of eye disorders, such as glaucoma, without the need for an operating room.

For example, the herein described medical device provides a safe, minimally-invasive ab externo ophthalmological procedure. For example, for implantation of an ocular implant with only topical anesthesia. For example, for implantation of an ocular implant under the conjunctiva, or under the Tenon's capsule.

For example, the herein described medical device can be considered generally safer as the opening into the eye tissue layer is generally small.

For example, the herein described medical device allows more flexibility and ease of operation in terms of adjustable working angle, which can facilitate eye approach angle.

For example, the herein described medical device allows more flexibility and ease of operation in terms of being usable with either left or right handed user (ambidextrous usage possible).

For example, the herein described medical device can be held and manipulated by the use of only one hand, leaving the other hand free for other purposes.

For example, the herein described medical device allows more flexibility and ease of operation in terms of one or markings on the piercing member, indicative of having penetrated eye tissue layer at a desired depth.

For example, the herein described medical device can provide one or more of the following advantageous characteristics:

Reduced Tissue Trauma: The ab externo implant delivered through a needle as described herein minimizes the need for tissue dissection, thereby reducing trauma and potential scarring compared to procedures like the PreserFlo™ MicroShunt that require conjunctival dissection.

Lower Infection Risk: With the ab externo needle approach as described herein, the integrity of the eye's internal structures is less compromise, which may result in a decreased risk of infection compared to traditional methods that require more extensive manipulation of internal eye tissues. preserflo involves tissue dissection and an operating room which increase the complexity of the surgery, trauma to tissue and scarring possibility.

Material and Size Suitability: Considering the complications with existing shunt materials and sizes, the invention described herein may offer an implant that is better suited in terms of material compatibility and size, thus reducing irritation to the surrounding tissues.

Patient Comfort and Recovery: The less invasive nature of the needle-based ab externo procedure as described herein could enhance patient comfort during the surgery and potentially lead to quicker recovery times with less post-operative discomfort.

Surgical Efficiency: Less manipulation within the anterior chamber is required, simplifying the surgical process and possibly reducing the duration of the operation.

Predictable Outflow Direction: Like the traditional ab externo approach, the procedure as described herein allows for controlled and predictable direction of aqueous humor outflow, potentially resulting in more successful and diffuse subconjunctival blebs.

Reduced Stress for Patients: Procedures that are perceived as less invasive, such as the needle-based approach as described herein, may alleviate patient anxiety associated with more traditional surgical environments.

Potential for Improved Long-term Outcomes: The combination of reduced tissue dissection, less invasive technique, and controlled outflow may contribute to improved long-term success rates and functionality of the implant.

Such technical advantages of the medical device described herein will be more apparent to the person of skill in light of the present disclosure.

Eye Structures

Relevant structures of the eye will first be briefly described to provide background for the anatomical terms used herein.

FIG. 1 is a stylized depiction of a normal human eye. Certain anatomical details, well known to those skilled in the art, have been omitted for clarity and convenience.

The anterior chamber 100 is shown as bounded on its anterior surface by the cornea 102. The cornea 102 is connected on its periphery to the sclera 104, which is a tough fibrous tissue forming the white shell of the eye. Trabecular meshwork 106 is located on the outer periphery of the anterior chamber 100. The trabecular meshwork 106 extends 360 degrees circumferentially around the anterior chamber 100. Located on the outer peripheral surface of the trabecular meshwork 106 is Schlemm's canal 108. Schlemm's canal 108 extends 360 degrees circumferentially around the meshwork 106. At the apex formed between the iris 110, meshwork 106, and sclera 104, is angle 112.

Ocular Implant

In a broad embodiment, the present disclosure relates to an ocular implant.

In some embodiments, the ocular implant, when properly positioned in the eye, can allow fluid to flow from one eye location to another location. For instance, aqueous humour can flow out of the anterior chamber 110 of the eye thus reducing internal pressure in the eye. For example, the ocular implant can have an internal surface defining one or more internal lumens, which can form corresponding one or more channels for allowing such aqueous humour flow. In some embodiments, the ocular implant has an internal surface defining a substantially continuous single internal lumen forming a corresponding substantially continuous single channel. The ocular implant, when properly positioned in the eye, may thus be used for the treatment of glaucoma. This is envisioned to include primary, open-angle glaucoma and secondary, open-angle glaucoma. However, it is conceivable that this ocular implant could be used to treat other types of glaucoma, as well as other eye conditions that require the relief of intraocular pressure through the drainage of aqueous humor, such as pigment dispersion syndrome, neovascular glaucoma, uveitic glaucoma, chronic angle closure glaucoma, and pseudoexfoliation syndrome.

Additionally or alternatively, the ocular implant of the present disclosure can be used to deliver a substance into the eye, such as a drug or therapeutic agent. For example, saline or viscoelastic fluids. The saline fluid can be used for irrigation. For example, the viscoelastic fluids may comprise hyaluronic acid, chondroitin sulfate, cellulose, derivatives or mixtures thereof, or solutions thereof. In one variation, the viscoelastic fluid comprises sodium hyaluronate. In another variation, the viscoelastic composition may further include a drug. For example, the viscoelastic composition may include a drug suitable for treating glaucoma, reducing or lowering intraocular pressure (IOP), reducing inflammation, and/or preventing infection. Drugs such as an antimetabolite, steroid, heparin, other anticoagulants, and fibrinolytic compounds may also be delivered in combination with the viscoelastic composition. Examples of glaucoma drugs include prostaglandins, beta blockers, miotics, alpha adrenergic agonists, or carbonic anhydrase inhibitors. Anti-inflammatory drugs such as corticosteroids or other steroids may be used. For example, steroids such as prednisolone, prednisone, cortisone, cortisol, triamcinolone, or shorter acting steroids may be employed. Examples of antimetabolites include 5-fluoruracil or mitomycin C. In still another variation, the implant delivers the drug alone, without the viscoelastic composition. Saline solution may also be the fluid employed.

In some embodiments, the ocular implant of the present disclosure may also be coated on at least a portion of an internal surface, at least a portion of an external surface, or both, with a compound useful for treating ocular hypertension, glaucoma, or pre-glaucoma, infection, or scarring or inflammation postoperatively, and/or with a compound useful for reducing friction thus facilitating insertion in the eye.

In some embodiments, the ocular implant of the present disclosure may also be formed to be solid, semi-solid, or bio absorbable.

Illustrative embodiments of the ocular implant of the present disclosure with various structural configurations, will be further described in more detail below.

In some embodiments, ocular implant 10 includes an elongated body 20, which is configured such that, when properly installed in an eye, aqueous humour can flow out of the anterior chamber 110 of the eye thus reducing internal pressure in the eye. For example, the elongated body 20 can have an internal surface 25 defining an internal lumen forming a corresponding channel for allowing such aqueous humour flow.

In some embodiments, the elongated body 20 can have a substantially circular cross-section over at least a portion thereof. For example, the elongated body 20 can have a substantially circular cross-section over its entire length. In some embodiments, the elongated body 20 can have a substantially rectangular, oval or hexagonal cross-section over at least a portion thereof. In some embodiments, the elongated body 20 can have more than one cross-section shape along its length, for example, a combination of cylindrical and oval cross-section shapes along its length.

In some embodiments, the elongated body 20 can have a cross-section size or shape such that the internal diameter of the lumen defined therein is substantially constant along at least a portion thereof. For example, the elongated body 20 can have a cross-section size or shape such that the internal diameter of the lumen defined therein is substantially constant over its entire length.

In some embodiments, the elongated body 20 can have a cross-section shape such that the internal diameter of the lumen is tapered along at least a portion thereof. For example, the elongated body 20 can have a cross-section shape such that the internal diameter of the lumen is tapered over its entire length.

Figure 4B:
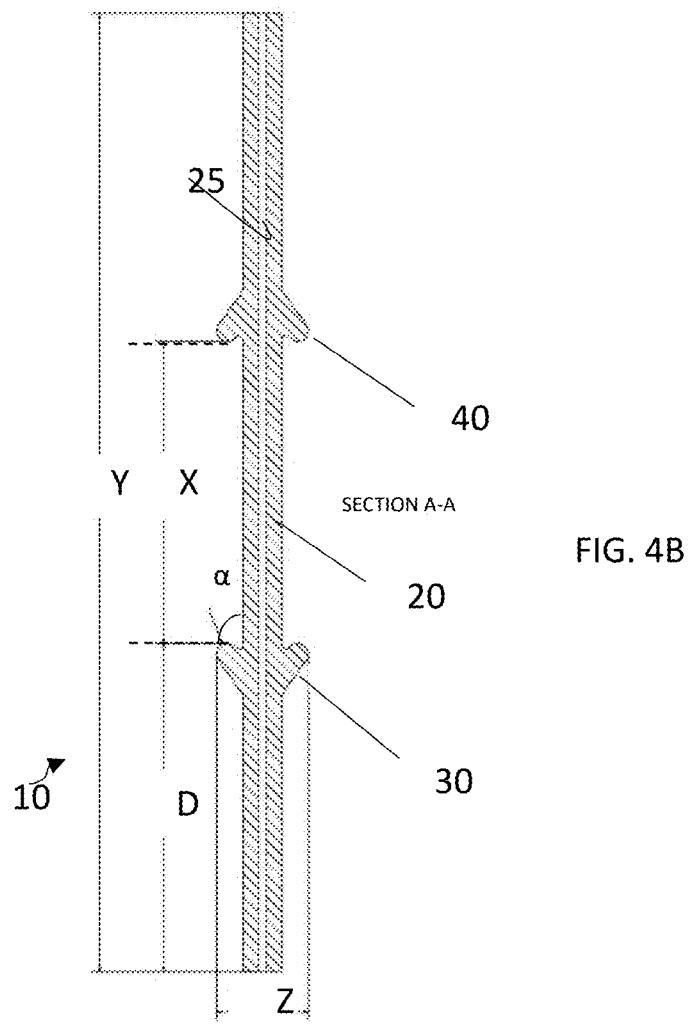
FIG. 4B is a non-limiting longitudinal cross section view of the ocular implant of FIG. 4A.

In some embodiments, the elongated body 20 can be substantially straight along at least a portion thereof. For example, the elongated body 20 can be substantially straight along its entire length as shown in FIG. 4B. In some embodiments, the elongated body 20 can be flexed or curved, in transient or permanent fashion, depending on specific applications. In some embodiments, the elongated body 20 can be rigid or flexible, depending on specific applications.

In some embodiments, the elongated body 20 can have a length that is suitable for proper placing in the eye. For example, the elongated body 20 can have a length such that, when the ocular implant 10 is properly positioned in the eye, it is comfortably placed in the eye and transverse the desired eye structure, such as the sclera 104. For example, the elongated body 20 can have a length Y between about 1.0 and about 12.0 mm, including any values or ranges therein. For example, a length Y of from about 5.0 mm to about 6.5 mm. For example, a length of about 6.0 mm, 6.3 mm, about 6.35 mm, or about 6.4 mm, preferably a length Y of about 6.35 mm.

In some embodiments, the elongated body 20 can have a lumen cross section size that is suitable for proper function. In some embodiments, the lumen cross section diameter S can be such as to facilitate drainage of aqueous humor from the eye, for example through passive drainage. For example, the lumen may have a cross section diameter S of from about 0.010 mm to about 0.250 mm, including any values or ranges therein. For example, the lumen may have a cross section diameter S of from about 0.035 mm to about 0.075 mm. For example, a lumen cross section diameter S of about 0.050 mm, about 0.055 mm, or about 0.060 mm. For example, a lumen cross section diameter S of about 0.050 mm, preferably a lumen cross section diameter S of about 0.051 mm or of about 0.053 mm.

In some embodiments, the elongated body 20 can have an outside wall defining an outside diameter OD that is suitable for proper function. In some embodiments, the elongated body 20 has an outside diameter OD that such that, when the ocular implant 10 is properly positioned in the eye, it is comfortably placed in the eye. For example, an outside diameter OD of from about 0.100 mm to about 0.450 mm, including any values or ranges therein. For example, an outside diameter OD of about 0.150 mm, about 0.200 mm, about 0.300 mm, or about 0.400 mm. For example, an outside diameter OD of about 0.255 mm, preferably an outside diameter OD of about 0.254 mm.

In some embodiments, the elongated body 20 further comprises a first engaging element 30 and a second engaging element 40 located at the surface of the elongated body 20. For example, both the first and second engaging elements 30, 40 extend away from the surface of the elongated body 20. The first and second engaging elements 30, 40 are configured such that, when the ocular implant 10 is properly positioned in the eye, the first and second engaging elements 30, 40 engage with, or abut against, eye tissue structures to prevent movement of the ocular implant 10 relative to the eye, thus allowing proper functioning thereof. For example, the first and second engaging elements 30, 40 can be configured such that, when the ocular implant 10 is properly positioned in the eye, the engaging element 30 engages with, or abuts against, an internal surface of the tissue layer, e.g., sclera 104 (i.e., a surface facing the anterior chamber 100 of the eye) whereas the engaging element 40 engages with, or abuts against, an external surface of the tissue layer, e.g., sclera 104 (i.e., a surface facing the external surface of the eye, opposite the anterior chamber 100 of the eye).

Figure 4A:
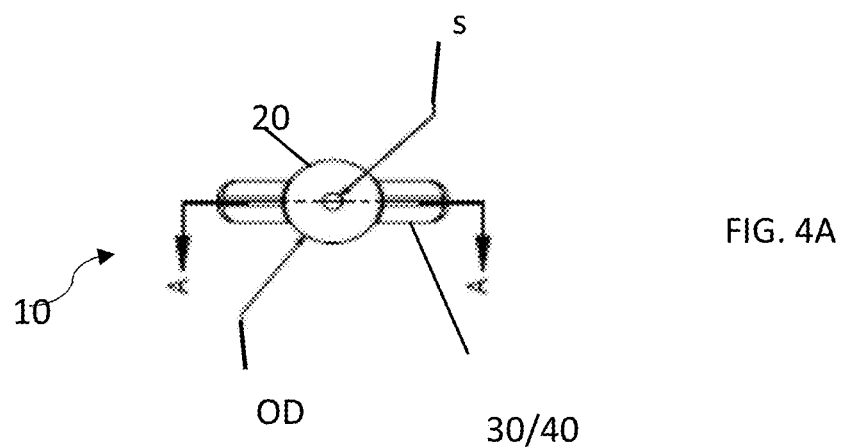
FIG. 4A is a front view of an ocular implant in accordance with an embodiment of the present disclosure.

As shown in FIG. 4A, the first and second engaging elements 30, 40 are advantageously respectively positioned at a distal and proximal portion of the elongated body 20. In other words, the first and second engaging elements 30, 40 are in a spaced apart relationship along the longitudinal axis of the elongated body 20. For example, the first and second engaging elements 30, 40 can be positioned at a position D from the respective proximal or distal end of the elongated body 20, which can be for example of from about 1.5 mm to about 3.0 mm, including any values or ranges therein. For example, a position D from the respective proximal or distal end of the elongated body 20 of about 1.80 mm, about 2.00 mm, about 2.20 mm, or about 2.30 mm. For example, a position D of about 2.18 mm.

In some embodiments, the first and second engaging elements 30, 40 may comprise protrusions that extend from the elongated body 20 at an angle α relative to the surface of the elongated body 20. For example, the angle α relative to the external surface of the elongated body 20 can be an acute angle, such as from about 5 to less than 90 degrees. For example, the engaging element 30 can be angled toward the engaging element 40; or the engaging element 40 can be angled toward the engaging element 30; or both the first and second engaging elements 30, 40 can be angled toward each other. For example, the protrusions may have any suitable shape, such as hooks, rod, bars, disk, ledges, steps, or any other suitable shape. Preferably, the first and second engaging elements 30, 40 have a rod shape that extend from the elongated body at an acute angle. In some embodiments, the first and second engaging elements 30, 40 may include one or more protrusions that project away from the elongated body 20.

In some embodiments, the first and second engaging elements 30, 40 may advantageously be deformable. For example, the first and second engaging elements 30, 40 are capable of being compressed towards the elongated body 20, e.g., in response to a compressing force, and then return to their initial position when required, e.g., upon release of the compressing force. For example, the first and second engaging elements 30, 40 may be made of resilient material.

Advantageously, the first and second engaging elements 30, 40 are positioned along the surface of the elongated body 20 at a distance X one from another that enables same to engage with, or abuts against, desired eye structures. For example, the distance X may be one that, when the ocular implant 10 is properly positioned in the eye, the first and second engaging elements 30, 40 to engage with, or abut against, the internal and external surfaces of the sclera, respectively. For example, the first and second engaging elements 30, 40 may be spaced such that approximately one-third of the elongated body 20 lies between the first and second engaging elements 30, 40. It is also contemplated that the first and second engaging elements 30, 40 may be spaced variably, without limitation, along the length of the elongated body 20 to ensure the proper functioning and security of the ocular implant 10. For example, the distance X may be from about 1.8 mm to about 2.2 mm, including any values or ranges therein. For example, the distance X may be of about 1.9 mm, about 2.0 mm, or about 2.1 mm. For example, a distance X of about 2.0 mm.

In some embodiments, the first and second engaging elements 30, 40 may advantageously have protrusions positioned opposite one another on the elongated body 20, as shown in FIG. 4B, to prevent migration of the ocular implant 10 relative to the eye, when the ocular implant 10 is properly positioned in the eye. For example, the ocular implant 10 may be delivered through the cornea 102 or iridocorneal angle 112 into the anterior chamber 100. For example, the ocular implant 10 may be delivered through a scleral tunnel into the iridocorneal angle. In certain embodiments, the ocular implant 10 may be inserted under other eye structures, such as the conjunctiva, the Tenon's capsule, through the sclera into the irido corneal angle in the anterior chamber 100, for example. For example, the first and second engaging elements 30, 40 may have protrusions that extend away from the elongated body 20 thus forming a combined width Z with the elongated body 20 of from about 0.400 mm to about 0.800 mm, including any values or ranges therein. For example, a combined width Z of about 0.500 mm, about 0.600 mm, about 0.700 mm. For example, a combined width Z of about 0.600 mm.

In a particular embodiment, the ocular implant 10 may have one or more of the following size characteristics: an outer diameter OD of about 0.254 mm, cross section diameter S of about 0.051 mm, a length Y of about 6.35 mm, a combined width Z of about 0.6 mm, and a distance X between the first and second engaging elements of about 2.0 mm.

In some embodiments, since the engaging element 40 does not enter the eye tissue layer, then it may be less flexible than the engaging element 30 that enters the eye tissue layer. This could allow the ocular implant 10 to be inserted in the eye tissue layer by deforming the engaging element 30 to fit within a small incision in the eye tissue layer, and the engaging element 30 to expand once it passes through the incision and the ocular implant 10 is in place in the eye tissue layer.

The reader will recognize that such capacity of the engaging element 30 to be deformed and expanded provides a technical advantage in that the procedure for insertion of the ocular implant into the eye tissue layer requires a smaller incision in the eye tissue layer, than it would otherwise be required if the engaging element 30 did not have such capacity.

In some embodiments, the ocular implant 10, including the elongated body 20 and the first and second engaging elements 30, 40 can all be made from the same medical-grade material. Alternatively, either or both the first and second engaging elements 30, 40 can be made of a separate medical-grade material from that one of the elongated body 20. For example, such medical-grade materials include, but are not limited to, poly(methylmethacrylate) (PMMA), silicone, acrylic, hydrophobic acrylate, hydrophilic acrylate, COLLAMER™, Poly(Styrene-block-IsoButylene-block-Styrene) ("SIBS"), or any combinations thereof. Preferably, silicone.

In one non-limiting embodiment, the ocular implant 10 can be obtained by molding the ocular implant over an extended wire 50, where the wire 50 can extend through the manufacturing mold for the ocular implant. For example, the ocular implant material in viscous, semi-viscous, or liquid form can be injected into the mold while the wire 50 is extended there through, such that upon curing of the material, the wire 50 is surrounded by the ocular implant. Presence of the wire 50 during manufacturing of the ocular implant 10 can allow formation of the internal surface 25 defining a substantially continuous single internal lumen forming a corresponding substantially continuous single channel. Other approaches to manufacturing the ocular implant 10 allowing formation of the internal surface 25 can be envisioned by the person of skill for defining a substantially continuous single internal lumen forming a corresponding substantially continuous single channel. Laser cutting can be used of known procedures in order to obtain the herein described engaging elements 30, 40. In another embodiment, the first and second engaging elements 30, 40 can be directly obtained from the molding step, without need for laser cutting. Other suitable techniques may also be used, such as die cutting, laser cutting and simple mold.

As such, a manufacturing method for ocular implant 10 may include molding the ocular implant 10 over an extended wire 50, where the wire 50 extends through a manufacturing mold. The molding may further include injecting material in viscous, semi-viscous, or liquid form into the manufacturing mold containing the extended wire 50. The molding may further include curing the material to obtain the ocular implant 10. The method may further include removing the extended wire 50 from the ocular implant 10 to obtain an internal surface 25 defining a substantially continuous single internal lumen forming a corresponding substantially continuous single channel. Optionally, prior to removing the extended wire 50 from the ocular implant 10, the extended wire 50 may be useful in guiding and placing the ocular implant 10 inside the internal lumen of the piercing member 510.

Medical Device

Figure 2:
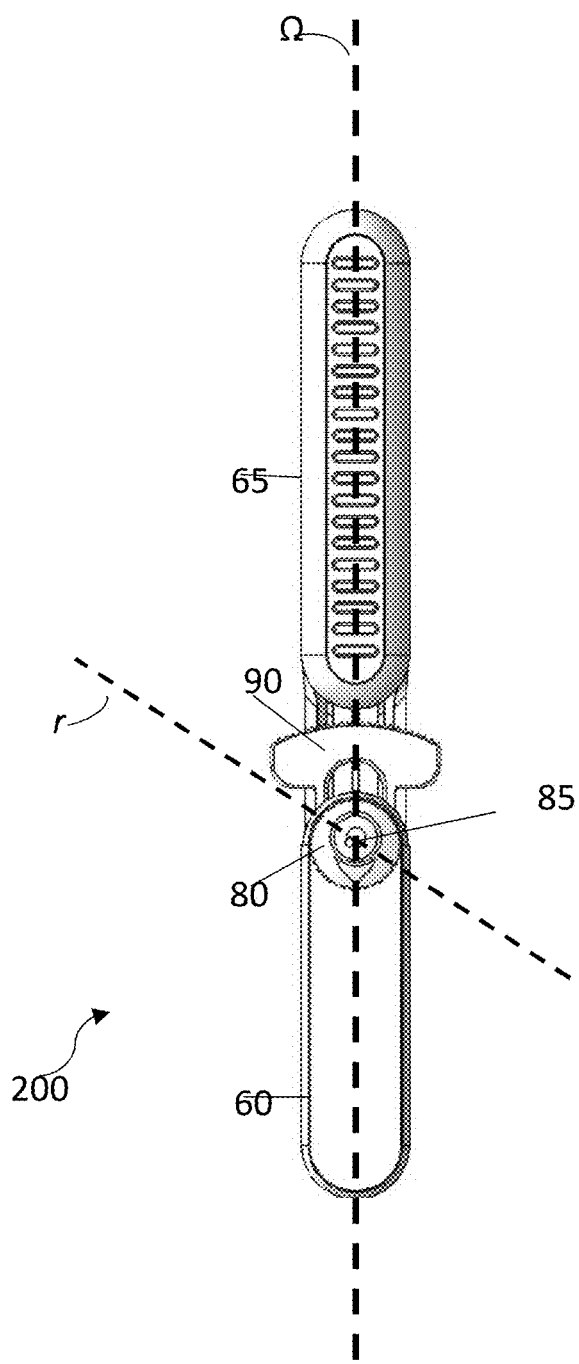
FIG. 2 is a non-limiting perspective view of an embodiment of a medical device in a first position in accordance with an embodiment of the present disclosure.

FIG. 2 illustrates a non-limiting implementation of a medical device that is arranged and configured in accordance with certain features, aspects, and advantages of the present disclosure. The illustrated medical device can be used for generating a channel in an eye tissue layer, such as with delivery of an ocular implant, or can be any other type of medical device that would benefit from any or all of the later described features, aspects and advantages of the present disclosure.

The term "tissue layer," as used herein, encompasses both a single tissue layer and a collection of layers, such as adjacent stacked layers (a multilayer) or distinct layers. However, the default interpretation typically refers to a single tissue layer. Additionally, when referring to a "tissue layer," it often pertains to a tissue wall characterized by a specific thickness and two sides (outer and inner, or proximal and distal). In this context, the channel or hole created extends between these two sides of the tissue wall. To illustrate, the channel could be situated in the sclero-corneal junction of an individual's eye. This application may be employed to address glaucoma by reducing intraocular pressure, achieved through facilitating fluid communication between the anterior chamber of the eye and the interface connecting the episclera and conjunctiva tissues, or under the subconjunctiva or subtenon area, for example.

In some embodiments, the medical device 200 includes at least two segments: a proximal segment 65 for grasping by a user and a distal segment 60 that includes components for the desired ophthalmologic procedure.

In some embodiments, the proximal segment 65 may have at least a segment of the surface thereof which is raised, depressed, grooved, or textured to improve hold by the user or to improve comfort of the user. The user may be a medical practitioner, such as an ophthalmologist.

In some embodiment, the distal segment 60 can be separated from the medical device 200 for decommissioning, discarding, sterilization, and the like. In one embodiment, the proximal segment 65 can be separated from the medical device 200 for decommissioning, discarding, sterilization, and the like.

Figure 10:
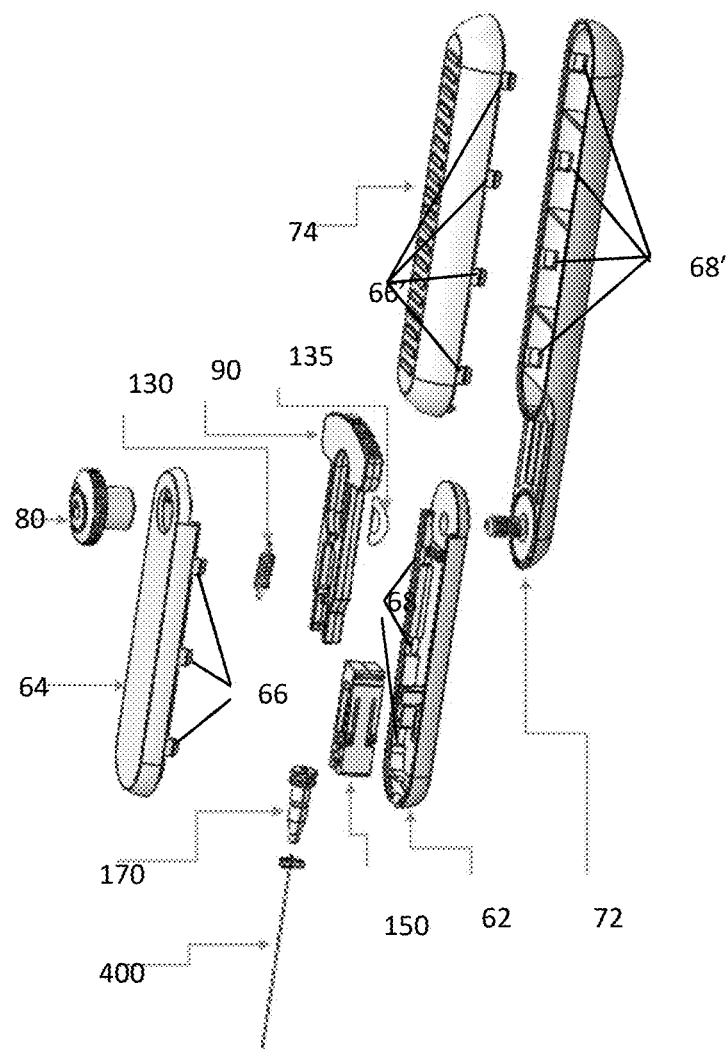
FIG. 10 is a non-limiting exploded view of the medical device, in accordance with embodiments of the present disclosure.

In some embodiment, the distal segment 60 can be formed with first and second housing portions 62, 64 (as shown in FIG. 10). For example, first and second housing portions 62, 64 may be configured to assemble one onto another through suitable coupling means. In one practical non-limiting implementation, the second housing portion 64 may include a plurality of peripherally spaced projections 66. Correspondingly, the first housing portion 62 may, accordingly, include a plurality of peripherally spaced notches 68 that receive the corresponding projections 66, so as to assemble the first and second housing portions 62, 64, thus forming the distal segment 60.

In some embodiment, the proximal segment 65 can be formed with first and second housing portions 72, 74 (as shown in FIG. 10). For example, first and second housing portions 72, 74 may be configured to assemble one onto another through any suitable coupling means. For example, the second housing portion 74 may include a plurality of peripherally spaced projections 66'. Correspondingly, the first housing portion 72 may, accordingly, include a plurality of peripherally spaced notches 68' that receive the corresponding projections 66', so as to assemble the first and second housing portions 62, 64, thus forming the proximal segment 65.

In some embodiment, the proximal segment 65 is coupled to the distal segment 60 through any suitable coupling element. For example, the proximal segment 65 can be coupled to the distal segment 60 through any suitable coupling element allowing the proximal segment 65 to be rotatable relative to the distal segment 60. For example, the proximal segment 65 can be coupled to the distal segment 60 at a pivot point 85, such that the proximal segment 65 and the distal segment 60 are rotatable relative to each other about a rotation axis r at the pivot point 85. For example, the rotation axis r can be substantially perpendicular to the longitudinal axis Ω of the proximal segment 65.

In some embodiment, the proximal segment 65 and the distal segment 60 are configured to couple to each other selectively from an unlocked configuration and a locked configuration. In the unlocked configuration, the proximal segment 65 and the distal segment 60 are rotatable relative to each other about the rotation axis r at the pivot point 85. In the locked configuration, the proximal segment 65 and the distal segment 60 remain coupled to each other at an angle β selected by the user, unless the unlocked configuration is achieved.

Figure 3:
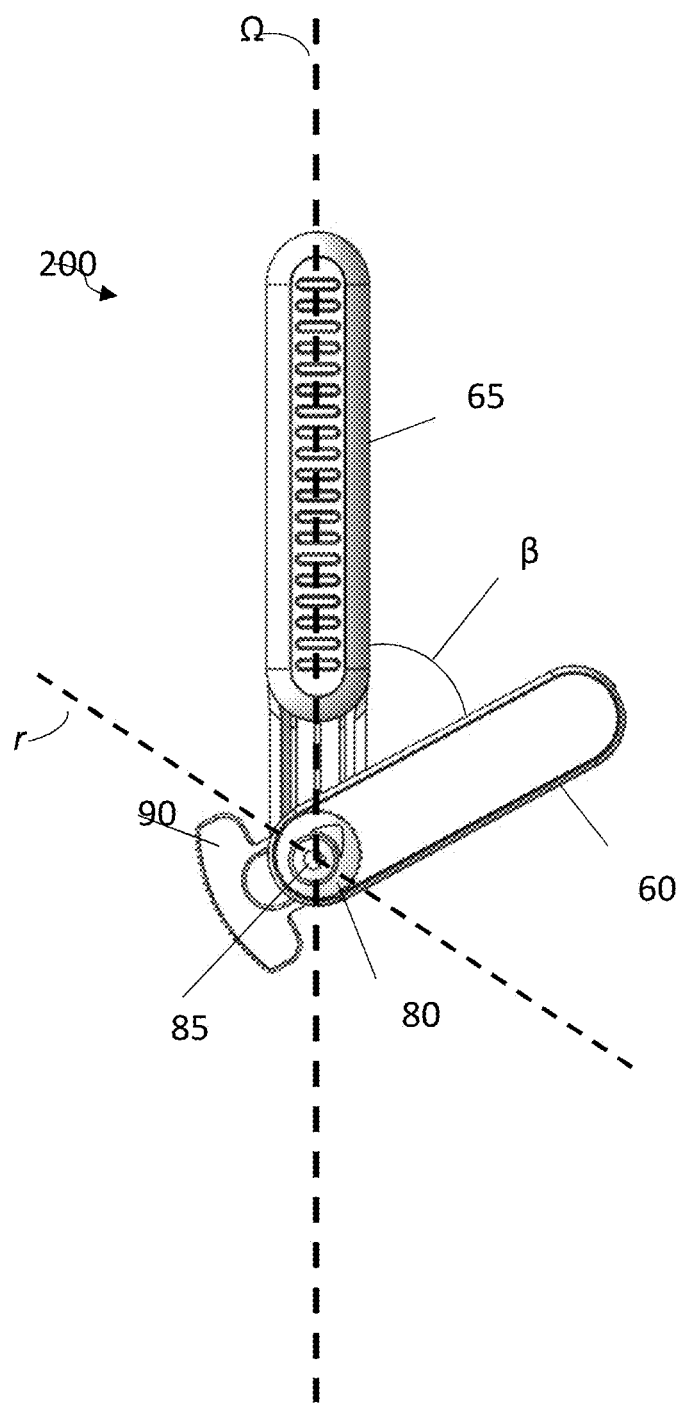
FIG. 3 is a non-limiting perspective view of the medical device of FIG. 2 in a second position in accordance with an embodiment of the present disclosure.

In some embodiment, the medical device 200 may include a locking mechanism 80 for reversibly securing the proximal segment 65 and the distal segment 60 in the locked configuration. Such locking mechanism 80 can afford a technical effect in that the medical device 200 can be locked into a position with a desired angle β, which allows the user to select a suitable working angle which can facilitate the ophthalmologic procedure. For example, such a working angle can be useful to adapt the medical device 200 to anatomical variabilities between left and right eye of a user, to anatomical variability between eyes, for different individuals, to personal preference of the user (e.g., medical practitioner), to use with left or right hand of the medical practitioner, and the like. The user (e.g., medical practitioner) can thus easily select a desired angle β, moving the medical device 200 from a first position (e.g., as shown in FIG. 2) to a second position (e.g., as shown in FIG. 3). Advantageously, the user can lock the medical device 200 to the first or second position using the herein described locking mechanism 80.

For example, the locking mechanism 80 may be, without being limiting, a knob that can be screwed and unscrewed, a latch or clamp that can reversibly fix the proximal segment 65 and the distal segment 60 in a user desired position, a ratchet-like rotating member that allows for rotation between the proximal segment 65 and the distal segment 60, and the like.

In some embodiments, the medical device 200 may include optional disk spring 135 for disc spring (best shown in FIG. 10), which is configured for maintaining pressure on the locking mechanism 80 (e.g., via threads of the knob) when it is loosened. Such configuration may allow a more pleasant user experience, for example by allowing a clicking feel when the distal segment 60 is rotated relative to the proximal segment 65.

In some embodiments, either or both the proximal segment 65 and the distal segment 60 are capable of being autoclaved or sterilized in some other manner. For example, either or both the proximal segment 65 and the distal segment 60 may be made from any suitable material, such as, but not limited to, polyethylene (PE) including low-density PE, high-density PE, ultra-high molecular weight PE; polypropylene (PP); polytetrafluoroethylene; thermoplastic polyurethane; polycarbonate; polyphtalic acid; acrylic; acrylonitrile butadiene styrene (ABS); silicon; and the like.

In some embodiments, the proximal segment 65 and the distal segment 60 may be configured to have a shape that facilitates handling during use of the medical device 200.

In some embodiments, the medical device 200 may have a suitable length, which is convenient for holding and operating with a single hand from the user. For example, the medical device 200 may have a length L from a proximal end of the proximal segment 65 to a distal end of the distal segment 60 of from about 100 mm to about 300 mm, including any values or ranges therein. For example, a length L of about 120 mm, about 130 mm, about 140 mm, about 150 mm, about 160 mm, about 170 mm, about 180 mm, about 190 mm, about 200 mm, about 210 mm, or about 220 mm. For example, a length L of about 140 mm, about 145 mm, or about 150 mm. For example, a length L of about 145 mm.

In some embodiments, the medical device 200 may have a suitable thickness, which is convenient for holding and operating with a single hand from the user. For example, the medical device 200 may have a thickness d1 of the distal segment 65 of from 6.0 mm to about 9.0 mm, including any values or ranges therein. For example, a thickness d1 of about 6.5 mm, about 7.0 mm, about 7.5 mm, or about 8.0 mm, preferably a thickness d1 of about 7.4 mm. For example, the medical device 200 may have a thickness d2 of the proximal segment together with actuator 90 of from 10.0 mm to about 20.0 mm, including any values or ranges therein. For example, a thickness d2 of about 12.0 mm, about 14.0 mm, about 14.5 mm, about 15.0 mm, about 15.5 mm, about 16.0 mm, about 17.0 mm, preferably a thickness d2 of about 15.4 mm.

In a practical non-limiting implementation of the present disclosure, the medical device 200 described herein includes ocular implant 10, as shown in FIG. 4A and FIG. 4B.

Piercing Member

In some embodiments, the medical device 200 described herein is particularly useful for installing an ocular implant in an eye to form a drainage channel. As will be apparent from the following description, in some embodiments, the medical device described herein can thus include the ocular implant, where the medical device is adapted for delivering and positioning the ocular implant in an eye of a patient.

In a non-limiting practical implementation, the medical device 200 includes a piercing member 510, which is coupled to and extends from the distal segment 60 distal end as shown in FIG. 5A. For example, the medical device 200 can be configured such that the piercing member 510 includes an elongated hollow body for containing therein the ocular implant.

In some embodiments, the medical device 200 is configured to retract the piercing member 510 from an extended position to a retracted position. For example, the medical device 200 can be configured to retract the piercing member 510 along the longitudinal axis of the distal segment 60 in a direction away from the eye. In other words, the medical device 200 can be configured to retract the piercing member 510 from a first position, where the piercing member 510 extends from the distal segment 60 and is visible to the user, to a second position where the piercing member 510 is at least partially contained within a distal portion of the distal segment 60. In use, retracting the piercing member 510 towards the distal segment 60 causes delivery of the ocular implant in the eye, i.e., leaves the implant 10 in the eye. The piercing member 510 can be configured to retract into an internal cavity of the distal segment 60. For example, to retract sufficiently far enough into the internal cavity of the distal segment 60 to deliver the ocular implant into the eye.

In some embodiments, the piercing member 510 can have one or more markings 120 on its outer surface, visible to the user, to assist the user with positioning the ocular implant in the eye. Such one or more markings 120 can aid with insertion of the piercing member 510 in the eye, for example to a desired eye location and/or to a specified depth to facilitate implantation of the ocular implant 10 in the eye of the patient. For example, such markings 120 can be obtained with laser tagging. This laser tagging can serve as an intuitive guide for the user during the ophthalmologic procedure, as will be described later in this text.

In some embodiments, the piercing member 510 may have at least a portion thereof which is transparent thus allowing the one or more markings 120 to be located on an inner surface of the transparent portion. Additionally, the presence of at least a portion of the piercing member 510 being transparent may further allow the user to visualize the inner contents of the piercing member 510, for example, the ocular implant.

In some embodiments, the piercing member 510 can be configured for performing an incision on an external surface of the tissue layer, for example the sclera 104. For example, the incision can be performed with the piercing member 510 slicing the tissue layer at an entry point. For example, the medical device 200 can be positioned at a first point with respect to the eye and advanced along the longitudinal axis until the piercing member 510 contacts the external surface of the eye tissue layer. At this point, the piercing member 510 is referred to as being in a first position. When the medical device 200 is further advanced towards the tissue layer, then the piercing member 510 performs, from the first position, an incision. Advantageously, the piercing member 510 is capable of performing the incision with an axial cutting motion. In other words, the cutting motion does not require any rotational movement of the piercing member 510.

For example, the piercing member 510 can be further configured to penetrate into and through the tissue layer, with axial displacement of the medical device 200 towards the tissue layer. Advantageously, the piercing member 510 is configured to penetrate into and through the tissue layer smoothly and easily with minimum force, therefore it can have a smooth (e.g., polished) outer surface to minimize friction during penetration into and through the tissue layer.

Figure 11:
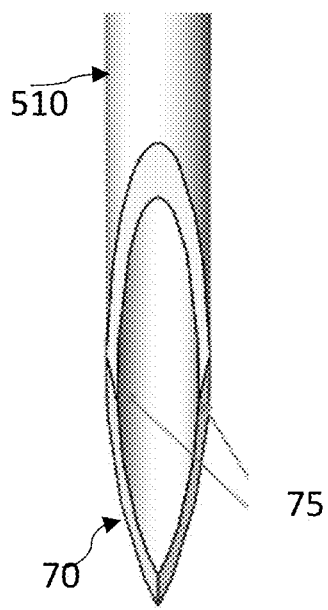
FIG. 11 is a non-limiting elevated view of the distal tip on the piercing member, in accordance with embodiments of the present disclosure.

In some embodiments, the piercing member 510 includes an elongated body having a piercing tip 70 at a distal end thereof, as shown in FIG. 11. For example, the piercing tip 70 may have a needle bevel shape, e.g., a sharpened angular tip. For example, the piercing tip 70 may have a cannula-style pointed/machined distal end. For example, the piercing tip 70 may have a relatively shallow primary bevel angle that allows eye tissue material to slip over more easily. For example, the piercing tip 70 may have a primary bevel angle of from about 10° to about 15°, preferably about 12°.

In some embodiments, the piercing member 510 may be of any gauge suitable for piercing the eye to cause an incision with a corresponding size sufficient to fit the ocular implant 10 there through.

In some embodiments, the piercing member 510 can serve at least a dual purpose, namely piercing an eye tissue layer and holding the ocular implant for positioning and delivery to the eye. For example, the piercing member 510 may be configured for containing the ocular implant 10, such as within a lumen thereof, as shown in FIG. 5B. In such embodiments, the first and second engaging elements 30, 40 may advantageously be capable of being deformed (e.g., flexed or compressed) toward the elongated body 20 to allow the ocular implant 10 to fit within the lumen of the piercing member 510. In some cases, the first and second engaging elements 30, 40 may transition between collapsed and deployed configurations by mechanical means, such as a lever or switch. In other cases, the first and second engaging elements 30, 40 may transition between the configurations by a passive mechanism, such as elasticity of the first and second engaging elements 30, 40, or free movement. The first and second engaging elements 30, 40 may be stored in a collapsed configuration in the piercing member 510.

In some embodiments, the piercing member 510 includes one or more markings 120 (e.g., laser tagging) on a surface thereof. Such one or more markings 120 can serve as a cue for the user. For example, during insertion of the piercing member 510 into and through the tissue layer, the one or more markings 120 (e.g., laser tagging) may be indicative of when the piercing member 510 has reached a desired depth into the eye tissue layer.

In some embodiments, the one or more markings 120 are disposed in a spaced apart relationship on the surface of the piercing member 510 at a location that coincides with the respective position of the first and second engaging elements 30, 40. As discussed elsewhere in this text, the first and second engaging elements are positioned along the surface of the elongated body 20 at a distance X one from another that enables same to engage with, or abuts against, desired eye structures. Accordingly, the one or more markings 120 can be similarly disposed on the surface of the piercing member 510 at a corresponding distance X' one from another that is equivalent to the distance X. For example, a distance X' of from about 1.8 mm to about 2.2 mm, including any values or ranges therein. For example, a distance X' of about 1.9 mm, about 2.0 mm, or about 2.1 mm. For example, a distance X' of about 2.0 mm.

For example, when mounting the ocular implant 10 into the piercing member 510, the ocular implant 10 can be placed inside the piercing member 510 lumen such that the first and second engaging elements 30, 40 respective position coincides with that one of the one or more markings 120. In some embodiments, the piercing member 510 may thus include a first marking 120 at a first position that coincides with the position of the engaging element 30 and a second marking 120 at a second position that coincides with the position of the engaging element 40. As such, during the procedure, the user can rely on the markings 120 as a cue; at the second marking 120, the user is guided to release the control point (e.g., actuator 90), enabling the ocular implant 10 to remain in place, as described elsewhere in this text. This technique ensures that the ocular implant 10 is not forcefully pushed but rather left in its intended position through a controlled and intuitive process.

In some embodiments, the piercing member 510 can have a suitable size, which may be selected from any one of the needle gauge size listed in Table 1:

TABLE 1

| Needle gauge | Outer diameter (inches) | Outer diameter (mm) | Inner diameter (inches) | Inner diameter (mm) |
| --- | --- | --- | --- | --- |
| 7 | 0.180 | 4.572 | 0.150 | 3.810 |
| 8 | 0.165 | 4.191 | 0.135 | 3.429 |
| 9 | 0.148 | 3.759 | 0.118 | 2.997 |
| 10 | 0.134 | 3.404 | 0.106 | 2.692 |
| 11 | 0.120 | 3.048 | 0.094 | 2.388 |
| 12 | 0.109 | 2.769 | 0.085 | 2.159 |
| 13 | 0.095 | 2.413 | 0.071 | 1.803 |
| 14 | 0.083 | 2.108 | 0.063 | 1.600 |
| 15 | 0.072 | 1.829 | 0.054 | 1.372 |
| 16 | 0.065 | 1.651 | 0.047 | 1.194 |
| 17 | 0.058 | 1.473 | 0.042 | 1.067 |
| 18 | 0.050 | 1.270 | 0.033 | 0.838 |
| 19 | 0.042 | 1.067 | 0.027 | 0.686 |
| 20 | 0.03575 | 0.9081 | 0.02375 | 0.603 |
| 21 | 0.03225 | 0.8192 | 0.02025 | 0.514 |
| 22 | 0.02825 | 0.7176 | 0.01625 | 0.413 |
| 22s | 0.02825 | 0.7176 | 0.006 | 0.152 |
| 23 | 0.02525 | 0.6414 | 0.01325 | 0.337 |
| 24 | 0.02225 | 0.5652 | 0.01225 | 0.311 |
| 25 | 0.02025 | 0.5144 | 0.01025 | 0.260 |
| 26 | 0.01825 | 0.4636 | 0.01025 | 0.260 |
| 26s | 0.01865 | 0.4737 | 0.005 | 0.127 |
| 27 | 0.01625 | 0.4128 | 0.00825 | 0.210 |
| 28 | 0.01425 | 0.3620 | 0.00725 | 0.184 |
| 29 | 0.01325 | 0.3366 | 0.00725 | 0.184 |
| 30 | 0.01225 | 0.3112 | 0.00625 | 0.159 |
| 31 | 0.01025 | 0.2604 | 0.00525 | 0.133 |

In some embodiments, the piercing member 510 has a size corresponding to a needle gauge of from 23 to 30. Preferably, the piercing member 510 has a size corresponding to a needle gauge of 27.

In some embodiments, the piercing member 510 has a length L2 of from about 8.0 mm to about 20.0 mm, including any values or ranges therein. For example, the piercing member 510 has a length L2 of about 10.0 mm, about 11.0 mm, about 12.0 mm, about 13.0 mm, about 14.0 mm, about 15.0 mm, preferably a length L2 of about 13.0 mm.

In some embodiments, the medical device 200 may include a cap 900, which is configured for mounting and securing over the piercing tip 70 of the piercing member 510, as shown in FIG. 9A and FIG. 9B. Such cap 900 may be advantageous to avoid potential needle sticks, for example, when handling, discarding or decommissioning the medical device 200. The cap 900 includes a mouth 910, which can be configured for abutting against a distal end of the distal segment 60 such as when the cap 900 covers the entire length of the piercing member 510.

Actuation Assembly

In a broad embodiment, the medical device 200 includes an actuation assembly configured to actuate the piercing member 510 to deliver the ocular implant 10 into an eye. While the following text describes a particular implementation of an actuation assembly with reference to the figures, the reader will nevertheless understand that variations may be used to achieve a similar result.

Figures 7A, 7B:
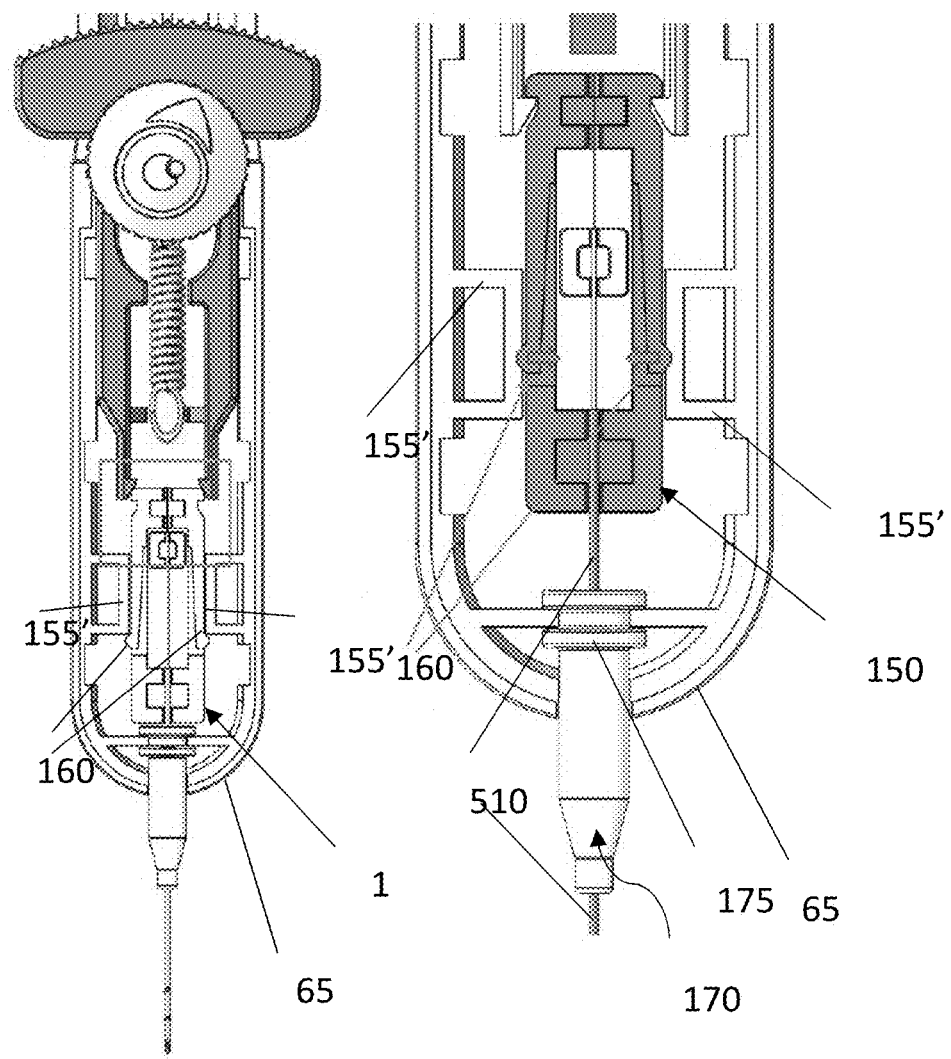
FIGS. 7A-7B are non-limiting cross section views of a distal segment of the medical device, in accordance with embodiments of the present disclosure.

FIGS. 7A-7B illustrate a non-limiting practical implementation of the actuation assembly, which includes suitable component or combination of components capable of providing the functionality described herein. For example, the actuation assembly includes a control point which can be engaged by the user to actuate the piercing member 510 to deliver the ocular implant 10 into the eye, such as the human eye. In some embodiment, the control point can take the form of an actuator 90. For example, the actuator 90 can be conveniently located on the outer housing of the distal segment 60. For example, the actuator 90 can be located at a proximal portion of the distal segment 60 for ease of access with a finger, preferably the index.

Figure 6A:
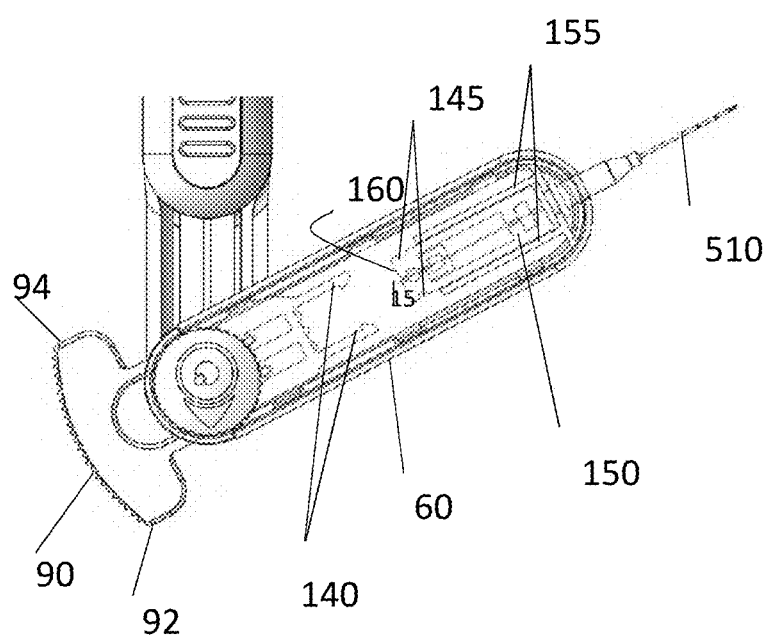

Conveniently, the actuator 90 can be shaped to facilitate ambidextrous actuation thereof. For example, as shown in FIG. 6A, the actuator 90 can have a shape including extensions 92, 94 which each extends away from the distal segment 60. In use, when the distal segment 60 and proximal segment 65 are in a locked configuration, the extensions 92, 94 can be conveniently located on each side of the pivot point 85 to facilitate actuation with either the left or right hand holding the proximal segment 65.

In some embodiments, the actuator 90 may be a slider, trigger, wheel, or any other form that can be easily engaged, preferably with only one finger, such as the index.

In some embodiments, and with reference to FIG. 6A, the actuator 90 may include teeth, or some other form that is capable of providing friction, along an edge thereof to improve the user's ability to confidently engage and release the actuator 90, even when moisture is present or when the user is wearing gloves. Furthermore, to improve the safety of using the medical device 200, the actuator 90 may include a locking mechanism or a means of preventing the unintended engagement or release of said actuator.

In some embodiments, the actuator 90 may be made of the same or different material as the distal segment 60.

In some embodiments, the actuator 90 may be equipped with a return mechanism, which is designed to facilitate, assist or direct the actuator 90 to return to the second position, when the user releases the actuator 90, as shown in FIG. 6C with arrow 700'. For example, the return mechanism may include a spring assembly or band. For example, the return mechanism may include a spring assembly 130 that connects the actuator 90 to distal segment 60. In use, pressing the actuator 90 towards the proximal end of the distal segment 60 causes the spring assembly 130 to extend along a longitudinal axis of the distal segment 60, and releasing the actuator 90, causes the spring assembly 130 to retract thus driving the actuator 90 away from the proximal end of the distal segment 60, as shown in FIG. 6C. Of course, many other forms of return mechanisms may be devised to cause the actuator 90 to return to the first position, when the user releases the actuator 90.

In some embodiments, the actuation assembly may further include a projection 125, which extends towards the distal end of the distal segment 65. For example, the projection 125 can be configured to operatively couple to the actuator 90 such that actuation of the actuator 90 from a first position to a second position causes an axial displacement of the projection 125 along the longitudinal axis of the distal segment 60. Such coupling can be permanent or transient. A non-limiting implementation of a permanent coupling is shown in FIG. 3A, where the projection 125 and the actuator 90 can be made from a solidary body, e.g. the projection 125 can extend from the actuator 90.

Lock-and-Release Mechanism

In some embodiments, the medical device 200 can be configured to implement a lock-and-release mechanism designed to securely hold the implant 10 in place until precise placement is achieved. For example, the user can activate the lock-and-release mechanism with engagement and release of the control point discussed above. A specific practical implementation of the lock-and-release mechanism will now be described.

In some embodiments, the medical device 200 include an internal casing 150 (or "bridge") located at a distal portion of the distal segment 60.

In some embodiment, the distal segment 60 includes an internal surface defining an internal cavity 15, which is configured to accommodate the internal casing 150.

In some embodiments, the internal casing 150 can be configured to operatively couple the projection 125 to the piercing member 510. Such coupling can be permanent or transient. A non-limiting implementation of a transient coupling will now be discussed.

In some embodiments, the internal casing 150 can be configured to engage with the projection 125 in presence of an actuation of the actuator 90 from a first position to a second position. In other words, the axial displacement of the projection 125 along the longitudinal axis of the distal segment 60 in response to the actuation of the actuator 90 from a first position to a second position causes an engagement between the projection 125 and the internal casing 150.

In some embodiments, the internal casing 150 conveniently include engaging elements 145 at a proximal portion thereof, which are configured to engage with the projection 125. For example, upon actuating the actuator 90 from a first position to a second position, causes the projection 125 to engage with engaging elements 145 of the internal casing 150. For example, the projection 125 may include engaging elements 140 located on a distal portion thereof configured to engage with complementary engaging elements 145. For example, the projection 125 may include prongs or other types of extending element on which are located the first and second engaging elements 140. Engagement of the first and second engaging elements 140, 145 functionally couples the actuator 90 to the internal casing 150, allowing a solidary movement between the actuator 90 and the internal casing 150. Embodiments that include such features can provide audible feedback to the operator (and others working with the operator), in the form of clicking sounds corresponding to engagement of engaging elements 140, 145.

In some embodiments, one of the first and second engaging elements 140, 145 may be a protrusion or pin while the other one of the first and second engaging elements 140, 145 may be a slot configured for engaging with the protrusion or pin. For example, one of the first and second engaging elements 140, 145 may be located on a distal portion of the projection 125 connected to the actuator 90, while the other one of the first and second engaging elements 140, 145 may be corresponding depressions located on a proximal portion of the internal casing 150. Of course, many other forms of complementary engaging elements may be devised that functionally couple the actuator 90 to the internal casing element 150.

Figure 6B:
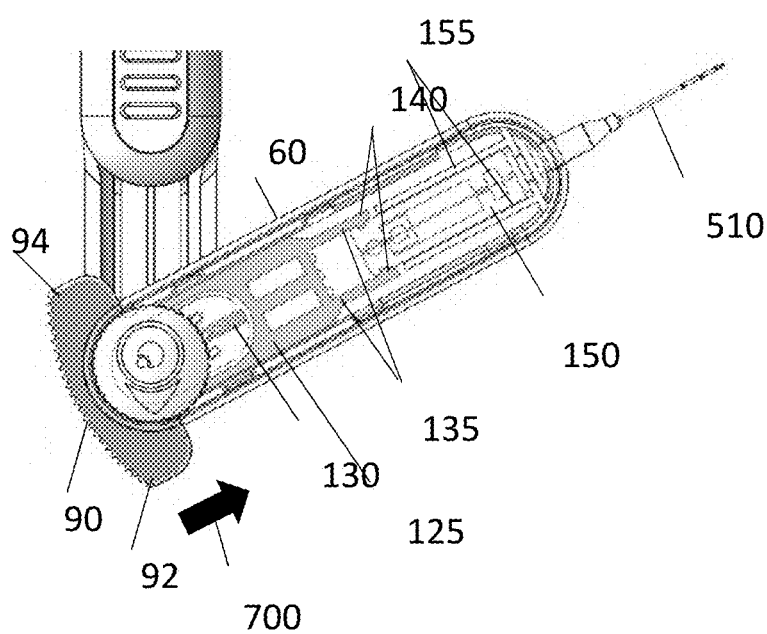

In a non-limiting practical implementation, as shown in FIG. 6B, actuating the actuator 90 from a first position to a second position (pressing movement shown with arrow 700) effectively moves the first and second engaging elements 140 located on prongs 135 extending from projection 125 towards the internal casing 150. In some embodiments, the projection 125 and the prongs 135 are a single piece component while, in other embodiments, the projection 125 and the prongs 135 are formed by multiple components that are joined together in any suitable manner.

For example, the prongs 135 may be made of a resilient material possessing some flexibility such that upon contacting a superior surface 160 of the internal casing 150, the distal portion of the prongs 135 containing engaging elements 140 are slightly pushed out radially to engage with the corresponding depressions of the first and second engaging elements 145 located on the proximal portion of the internal casing 150. Upon engaging with the depressions of the first and second engaging elements 145, the prongs 135 being made of a resilient material (e.g., resilient plastic) may thus snap back, compressing the first and second engaging elements 140 against the first and second engaging elements 145 thus securing the prongs 135 to the internal casing 150. Embodiments that include such features can provide audible feedback to the operator (and others working with the operator), in the form of clicking sounds corresponding to the prongs 135 snapping back, about the rate of progress of the ocular device 10 release operation.

In a non-limiting practical implementation, the actuator 90 starts in a first position, where it is disconnected from the internal casing 150, as shown in FIG. 6A. In this position, the user inserts the piercing member 510 into the eye of a patient to a specified depth. As discussed previously, when the piercing member 510 includes markings 120 (e.g., laser tagging), these can be advantageously used to provide guidance with respect to the specified depth. Once the piercing member 510 is positioned at the desired location and specified depth, the user actuates (shown as 700) the actuator 90 towards a second position, causing engagement of the first and second engaging elements 140, 145 one to another such that the actuator 90 functionally couples to the internal casing 150 to create a unitary component, as shown in FIG. 6B.

Finally, the user releases the actuator 90, e.g., by releasing pressure (shown as 700') applied to the actuator 90, such that the return mechanism causes the actuator 90 to retract from the second position to the first position. Since the first and second engaging elements 140, 145 are engaged one to another, the actuator 90 and the internal casing 150 are functionally coupled such that retraction of the actuator 90 away from the proximal end of the distal segment 60 will also retract the internal casing 150 towards the proximal end of the distal segment 60. The movement of the internal casing 150 towards the proximal end of the distal segment 60, causes the piercing member 510 operatively coupled to the internal casing 150 to also retract at least partially within the cavity 15, travelling through support 175 connected to distal segment 60, resulting in the release of the ocular implant 10.

In some embodiments, the medical device can include a tube 170 defining a channel which is held in place by support 175 connected to distal segment 60. The tube 170 can accommodated in its channel at least a portion of the piercing member 510. During movement of the internal casing 150 in response to the release 700' of the actuator 90 as shown in FIG. 6C, the support 175 and associated tube 170 are retained in place due to the support 175 being connected to distal segment 60, while the internal casing 150 and attached piercing member 510 move relatively to the support 175.

In some embodiments, the medical device 200 is configured to prevent lateral movement of the internal casing 150, for example when manipulating the medical device 200.

For example, in one embodiment, the medical device 200 may include retaining members 155 associated with an internal surface of the segment 60 that are located on each side of the internal casing 150. The retaining members 155 extend along a major portion (>50%) of the lateral dimension of the internal casing 150 engaging and preventing lateral movement thereof while allowing longitudinal movement of the internal casing 150, as shown in FIG. 6A.

For example, in another embodiment, the medical device 200 may include retaining members 155' associated with an internal surface of the segment 60 that are located on each side of the internal casing 150. The retaining members 155' extend along a minor portion (<50%) of the lateral dimension of the internal casing 150 engaging and preventing lateral movement thereof, as shown in FIG. 7A. In this example, the internal casing 150 may further include flexible arms 160 positioned on or integrated with either side of the internal casing 150. For example, the flexible arms 160 may extend from a proximal portion of the internal casing 150 towards a distal portion thereof, such that a distal end of the flexible arms 160 engages with or abuts against a corresponding distal portion of one of the retaining members 155' as shown in FIG. 7A.

In a rest position, this arrangement prevents lateral movement of the internal casing 150 and the internal casing 150 is restrained from sliding along the longitudinal axis of the distal segment 60. Such configuration can prevent the accidental movement of the internal casing 150 when inserting the piercing member 510 into the eye.

For example, the distal end of the flexible arms 160 may include a bulge or other suitable structure at a distal portion thereof, which engages with or abuts against a corresponding distal portion of one of the retaining members 155' as shown in FIG. 7A. The suitable structure at the distal portion of the flexible arms 160 is such to allow the flexible arms 160 to flex around an obstacle, such as the distal end of the retaining members 155'.

Indeed, when the internal casing 150 is retracted towards the proximal portion of the distal segment 60, the flexible arms 160 flex towards the internal casing 150 (shown as arrows in FIG. 7B) and slide over the retaining members 155'. Embodiments that include such features can provide audible feedback to the operator (and others working with the operator), in the form of clicking sounds corresponding to movements of the flexible arms 160, about the rate of progress of the ocular device 10 release operation.

Figure 8:
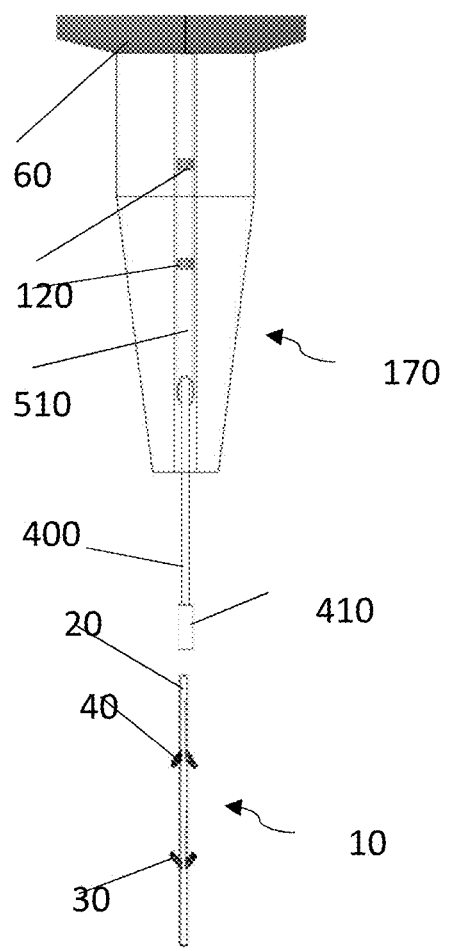
FIG. 8 is a non-limiting cross section view showing the ocular implant having been delivered with the piercing member of the medical device, in accordance with embodiments of the present disclosure.

As shown in FIG. 5B and FIG. 8, the medical device 200 can includes a stopper 400 positioned within the piercing member 510.

In some embodiments, the stopper 400 can be a solid tubular structure having a contact surface 410 configured for abutting against a proximal end of the implant 10 preventing axial displacement of the ocular implant 10 towards the distal end of the distal segment 60. In use, the ocular implant 10 remains at the specified depth while the piercing member 510 is retracted at least partially within the internal cavity 15 of the distal segment 60. The stopper 400 and the contact surface 410 can be made from any medical-grade material, such as for example medical-grade metal such as medical-grade tungsten, titanium, stainless steel, copper, cobalt chrome, aluminum, magnesium, or any alloys thereof; medical grade plastic, and the like. Preferably, tungsten.

Ophthalmologic Procedure

In a non-limiting practical implementation of the present disclosure, the medical device described herein can be used to form a drainage channel in an eye with insertion of an ocular implant in the eye tissue layer. Advantageously, the procedure can be performed using only topical anesthesia in an outpatient clinic, without need for an operating room. More advantageously, the procedure can be performed with an ab externo approach.

In general, the medical device described herein is designed for use in a method performing an insertion of an ocular implant in an eye tissue layer to form a drainage channel. After obtaining the medical device, the user can select a working angle between the distal segment and the proximal segment by selecting the unlocked configuration and rotating the distal segment about the rotation axis at the pivot point.

For example, performing the insertion may include positioning the medical device at a first point with respect to the eye and advancing the medical device along the longitudinal axis until the piercing member contacts an external surface of the eye tissue layer. At this step, the piercing member is at a first position.

For example, performing the insertion may further include distally progressing the medical device to cause the piercing member to perform an incision in the eye tissue layer with an axial cutting motion, and progressing the piercing member through the incision into and through the tissue layer. Such progression can occur, for instance, until the piercing member has reach a desired depth. For example, the desired depth can be determined based on a position of one or more marking on the piercing member.

For example, performing the insertion may further include retracting the piercing member towards a distal end of the distal segment, causing delivery of the ocular implant into the eye tissue layer. Advantageously, the medical device is configured to hold the implant securely during insertion. Once the implant reaches the desired depth, e.g., indicated with the one or more marking (e.g., laser tagging), the user can activate the ocular implant release mechanism simply by engaging and releasing a specified control point on the device (e.g., actuator). This action unlocks the ocular implant release mechanism, as described elsewhere in this text, allowing for the controlled release of the implant at the precise location. This design ensures that the implant is not pushed or placed forcefully, but rather released gently and accurately in the intended position.

A practical non-limiting implementation will now be described with reference to the figures.

Initially, the user obtains a medical device 200. In one example, the medical device 200 may already include the ocular implant 10. In another example, the medical device 200 and the ocular implant 10 may be separate components which require assembly prior to use.

The user can select a desired working angle β between the distal segment 60 and the proximal segment 65. In the unlocked configuration, the user rotates the distal segment about the rotation axis at the pivot point to select the working angle β between the distal segment 60 and the proximal segment 65. The user can then use the locking mechanism 80 to secure the distal segment 60 and the proximal segment 65 at the desired working angle β. For example, the desired working angle β may be selected based on whether the user is right or left handed, based on the patient eye anatomy, etc.

The user then positions the medical device 200 at a first point with respect to the eye and advanced along a longitudinal axis of the distal segment 60 until the piercing member 510 contacts the external surface of the tissue layer, e.g., the sclera 104. When the medical device 200 is further advanced towards the tissue layer, then the piercing member 510 performs an incision in the eye tissue layer with an axial cutting motion. For example, the incision may be performed with distal cutting tip 70 of the piercing member 510.

The use then further advances the medical device 200 towards the tissue layer such that the piercing member 510 penetrates the incision, into and through the tissue layer. Noteworthy, progressing the piercing member through the incision into and through the tissue layer is performed until the piercing member has reach a desired depth. For example, the desired depth can be determined based on a position of one or more marking 120 (e.g., laser tagging) on the piercing member relative to the eye tissue layer, which can serve as cue for the user to indicate when the desired depth has been reached. For example, the one or more markings 120 (e.g., laser tagging) disposed along the piercing member 510 can be present at a location that coincides with the respective position of the first and second engaging elements 30, 40.

The user then retracts the piercing member towards a distal end of the distal segment, causing release and delivery of the ocular implant into the eye tissue layer. This can be performed by engaging a control point on the device to unlock the ocular implant release mechanism to cause delivery of the ocular implant 10. For example, the user can engage the actuator 90, which causes the actuator 90 to functionally couple with the internal casing 150. For example, engaging the actuator 90 may cause the prongs 135 distal end to approach the proximal end of internal casing 150 such that engaging elements 140, 145 engage with one another functionally coupling the actuator 90 to the internal casing 150. The user can then release the actuator 90, which causes the internal casing 150 and the piercing member 510 to retract in a direction towards the proximal portion of the distal segment 60—i.e., in use, this direction being away from the eye tissue layer. For example, releasing the actuator 90 may be performed by releasing finger pressure on the actuator 90, such that the return mechanism retracts the actuator 90 towards the first position and causes the internal casing 150 and the piercing member 510 to also retract towards the proximal portion of the distal segment 60. Presence of stopper 400, 400' positioned within the piercing member 510 can be useful to further prevent any retracting displacement of the ocular implant (i.e., the ocular implant remains in place) when the piercing member 510 retracts towards the distal end of the distal segment, thus facilitating gentle and controlled delivery of the ocular implant.

As will be apparent to the reader, presence of one or more markings (e.g., laser tagging) along the position element 510 can be useful to guide the user as to when he/she should actuate the actuator 90. This technique ensures that the implant is not forcefully pushed but rather left in its intended position through a controlled and intuitive process.

In some embodiments, upon use, the medical device 200 can be discarded.

In some embodiments, upon use, the medical device 200 distal segment 60 can be discarded and replaced with a distal segment loaded with a new internal casing 150 containing a new ocular implant 10.

In some embodiments, upon use, the medical device 200 distal segment 60 can be opened and loaded with a new internal casing 150 containing a new ocular implant 10.

Other examples of implementations will become apparent to the reader in view of the teachings of the present description and as such, will not be further described here.

Note that titles or subtitles may be used throughout the present disclosure for convenience of a reader, but in no way these should limit the scope of the invention. Moreover, certain theories may be proposed and disclosed herein; however, in no way they, whether they are right or wrong, should limit the scope of the invention so long as the invention is practiced of the present disclosure without regard for any particular theory or scheme of action.

All references cited throughout the specification are hereby incorporated by reference in their entirety for all purposes.

Reference throughout the specification to "some embodiments", and so forth, means that a particular element (e.g., feature, structure, and/or characteristic) described in connection with the invention is included in at least one embodiment described herein, and may or may not be present in other embodiments. In addition, it is to be understood that the described inventive features may be combined in any suitable manner in the various embodiments.

It will be understood by those of skill in the art that throughout the present specification, the term "a" used before a term encompasses embodiments containing one or more to what the term refers. It will also be understood by those of skill in the art that throughout the present specification, the term "comprising", which is synonymous with "including," "containing," or "characterized by," is inclusive or open-ended and does not exclude additional, un-recited elements or method steps.

Unless otherwise defined, all technical and scientific terms used herein have the same meaning as commonly understood by one of ordinary skill in the art to which this invention pertains. In the case of conflict, the present document, including definitions will control.

As used in the present disclosure, the terms "around", "about" or "approximately" shall generally mean within the error margin generally accepted in the art. Hence, numerical quantities given herein generally include such error margin such that the terms "around", "about" or "approximately" can be inferred if not expressly stated. For example, a variation of +/−5% is encompassed by the terms "around", "about" or "approximately".

Although various embodiments of the disclosure have been described and illustrated, it will be apparent to those skilled in the art considering the present description that numerous modifications and variations can be made. The scope of the invention is defined more particularly in the appended claims.

The invention claimed is:

1. A medical device, comprising
   a) an ocular implant configured to facilitate aqueous humor outflow from an anterior chamber of an eye;
   b) a piercing member for penetrating ocular tissue and housing the ocular implant prior to delivery;
   c) a release structure associated with the piercing member and operable to deliver the ocular implant from the piercing member, the release structure comprising an internal casing disposed within a distal cavity of the medical device and coupled to the piercing member; and
   d) an actuator operatively associated with a displacement mechanism, the displacement mechanism comprising one or more movable elements responsive to actuation and operable to engage the release structure,
   wherein actuation of the actuator in a first direction causes the displacement mechanism to engage the release structure, and subsequent actuation of the actuator in a second direction causes coordinated retraction of the release structure and the piercing member to release the ocular implant from the piercing member and position the implant within the eye.

2. The medical device of claim 1, wherein the displacement mechanism includes a plurality of projections configured to engage with the internal casing and operatively coupled to the actuator.

3. The medical device of claim 1, wherein the actuator is a slider, a trigger, or a wheel.

4. The medical device of claim 1, wherein the actuator comprises a return mechanism configured to urge the actuator toward the second direction after actuation in the first direction.

5. The medical device of claim 4, wherein the return mechanism includes a spring assembly connected between the actuator and a distal segment of the device, the spring assembly being extendable along a longitudinal axis of the distal segment upon movement of the actuator in the first direction and retractable upon release of the actuator to return the actuator in the second direction.

6. The medical device of claim 2, wherein the internal casing includes engaging elements positioned at a proximal portion thereof, and the projections include complementary engaging elements located at distal portions thereof.

7. The medical device of claim 6, wherein engagement between the internal casing and the projections produces audible feedback in the form of one or more clicking sounds.

8. The medical device of claim 6, wherein the projections include prongs extending distally, and the complementary engaging elements are located on distal regions of the prongs.

9. The medical device of claim 8, wherein the prongs are formed of a resilient material and are deformable radially outward when contacting a superior surface of the internal casing, such that distal ends of the prongs engage with corresponding depressions formed in the internal casing.

10. The medical device of claim 1, further comprising a stopper positioned within the piercing member, the stopper including a distal-facing contact surface configured to abut a proximal end of the ocular implant to restrict movement of the implant during retraction of the piercing member.

11. The medical device of claim 1, wherein the piercing member has a diameter corresponding to a needle gauge between 23 and 30.

12. The medical device of claim 1, wherein the ocular implant comprises a first engaging element and a second engaging element positioned on a surface of the elongated body, each of the first and second engaging elements extending away from the body and being compressible toward the body.

13. The medical device of claim 1, wherein the first and second engaging elements are angled toward one another.

14. The medical device of claim 1, wherein the first and second engaging elements are spaced apart by a distance between about 1.8 mm and about 2.2 mm.

15. The medical device of claim 1, wherein the piercing member has a length between about 8.0 mm and about 20.0 mm.

16. The medical device of claim 1, further comprising a proximal segment configured for grasping by a user and a distal segment including the piercing member, wherein the proximal segment is separable from the medical device.

17. The medical device of claim 1, wherein the ocular implant comprises a biocompatible, flexible material and includes a lumen extending through the elongated body.

* * * * *